United States Patent
Jacobs et al.

[11] Patent Number: 6,098,965
[45] Date of Patent: Aug. 8, 2000

[54] REACTOR DISTRIBUTION APPARATUS AND QUENCH ZONE MIXING APPARATUS

[75] Inventors: Garry E. Jacobs, Aliso Viejo; Steven W. Stupin, Orange; Robert W. Kuskie, Santa Ana, all of Calif.; Robert A. Logman, Haarlem, Netherlands

[73] Assignee: Fluor Corporation, Aliso Viego, Calif.

[21] Appl. No.: 09/177,079

[22] Filed: Oct. 23, 1998

Related U.S. Application Data

[63] Continuation-in-part of application No. 08/659,122, Jun. 4, 1996, Pat. No. 5,989,502.
[51] Int. Cl.[7] ............................... F28D 21/00; B01F 3/00
[52] U.S. Cl. ........................ 261/114.2; 422/207; 422/422
[58] Field of Search ........................... 261/114.2, 114.5; 422/224, 220, 231, 207

[56] References Cited

U.S. PATENT DOCUMENTS 2,893,713  7/1959  Haltmeier ........................... 261/114.2

*Primary Examiner*—Marian C. Knode
*Assistant Examiner*—Alexa A. Doroshenk
*Attorney, Agent, or Firm*—Fish & Associates, LLP

[57] ABSTRACT

A quench zone mixing apparatus that occupies a low vertical height and has an improved mixing efficiency and fluid distribution across the catalyst surface includes a swirl chamber, a rough distribution network, and a distribution apparatus. In the swirl chamber, reactant fluid from a catalyst bed above is thoroughly mixed with a quench fluid by a swirling action. The mixed fluids exit the swirl chamber through an aperture to the rough distribution system where the fluids are radially distributed outward across the vessel to the distribution apparatus. The distribution apparatus includes a plate with a number of bubble caps and associated drip trays that multiply the liquid drip stream from the bubble caps to further symmetrically distribute the fluids across the catalyst surface. Alternatively, deflector baffles may be associated with the bubble caps to provide a wider and more uniform liquid distribution below the plate. The distribution apparatus can be used in the reaction vessel without the swirl chamber and rough distribution system, e.g., at the top of a vessel.

20 Claims, 17 Drawing Sheets

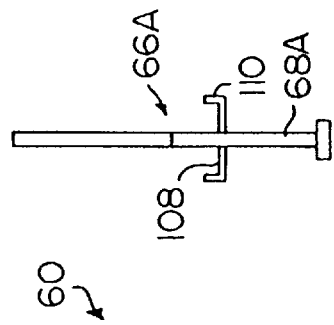
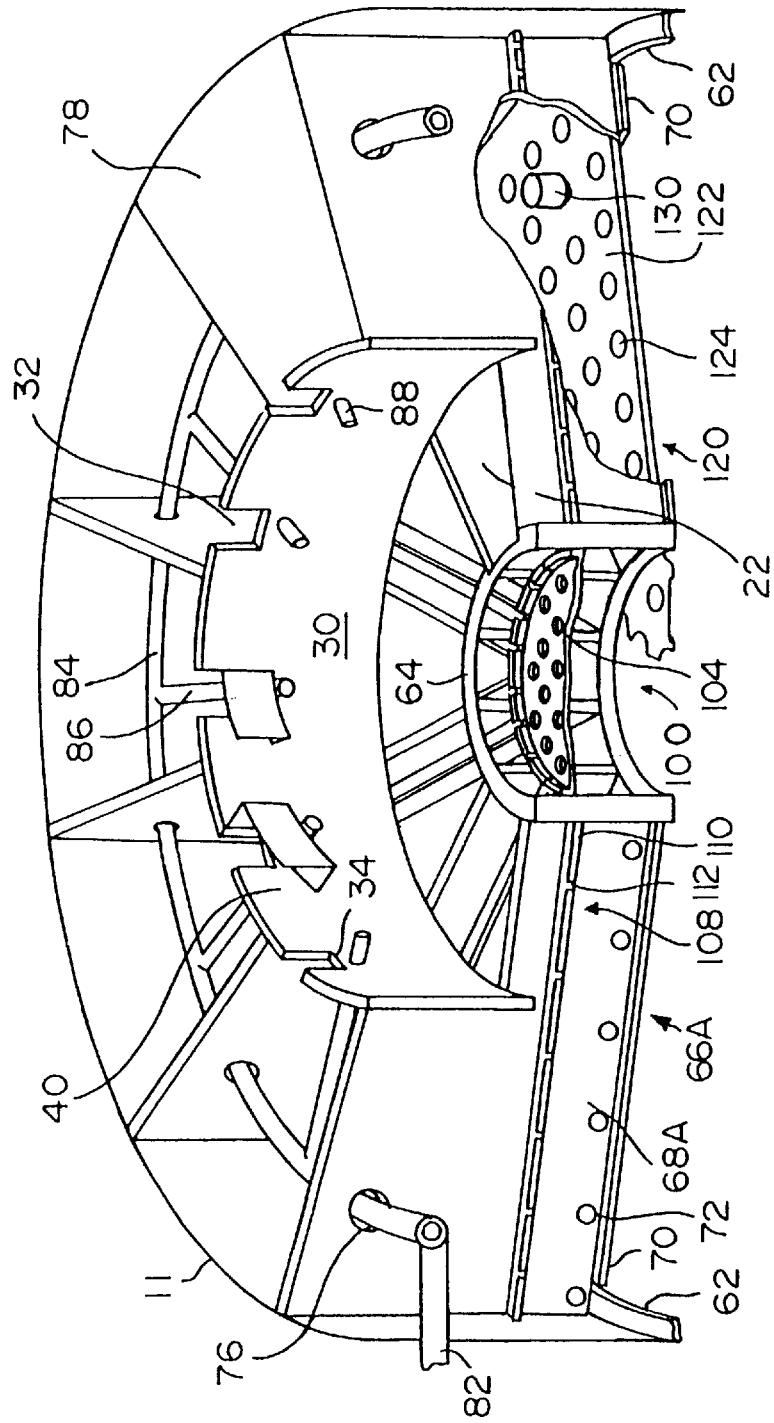

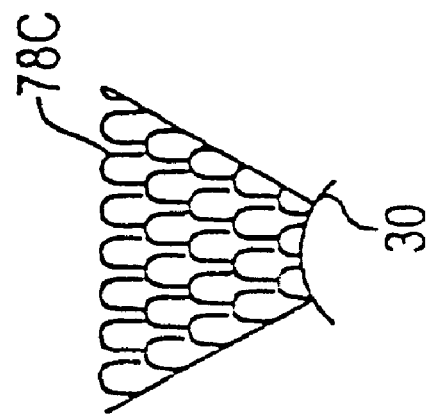
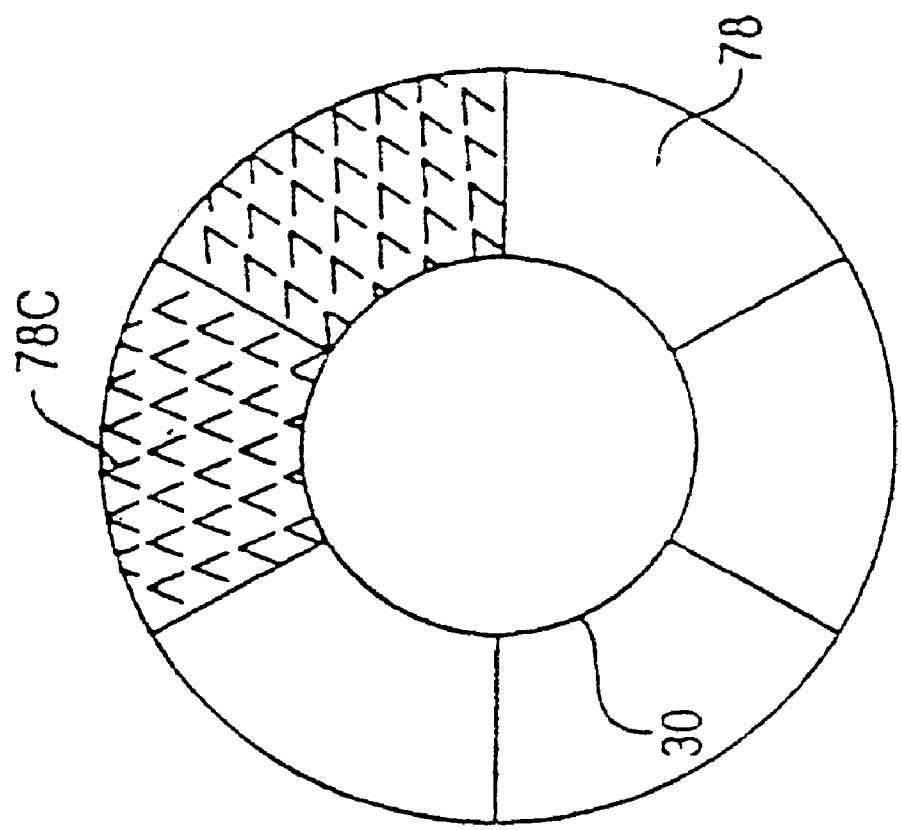

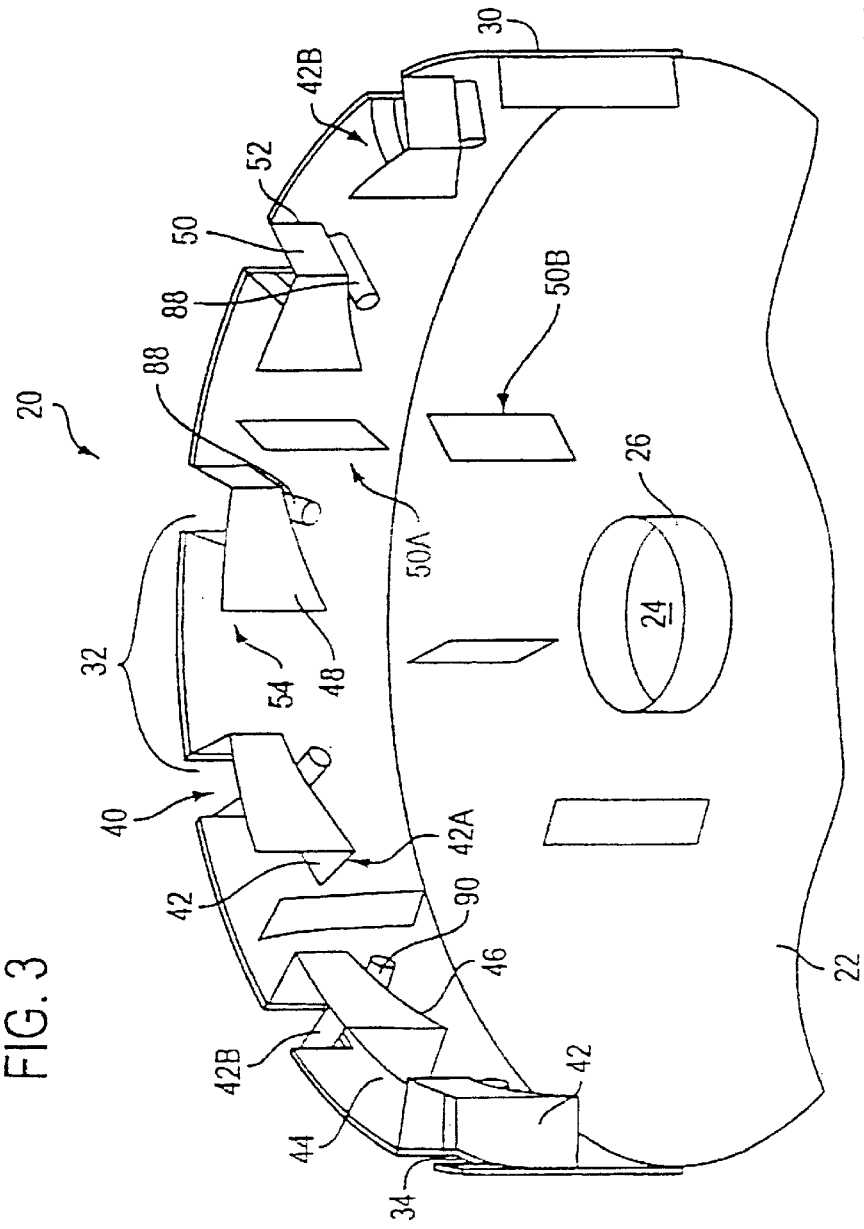

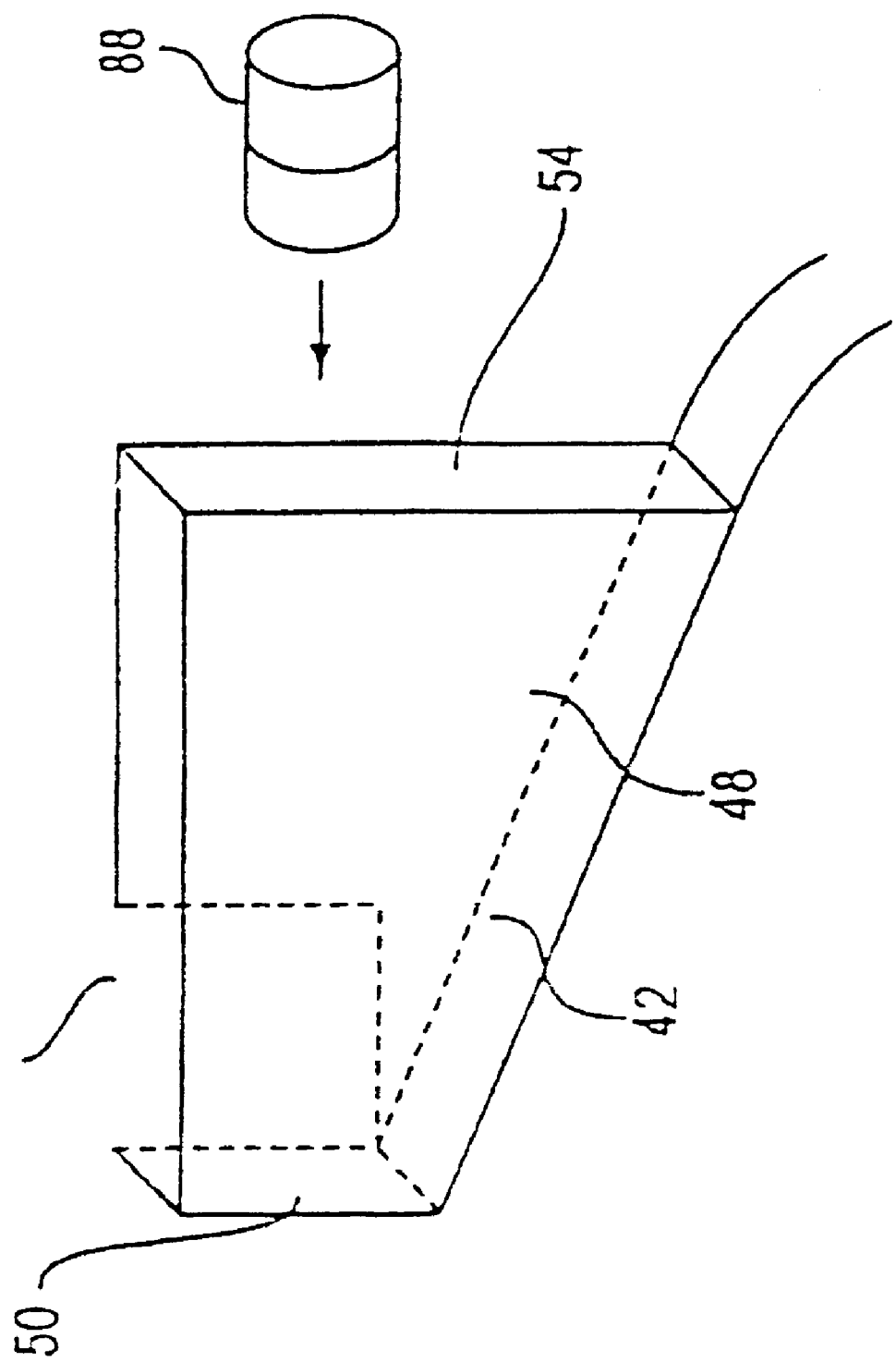

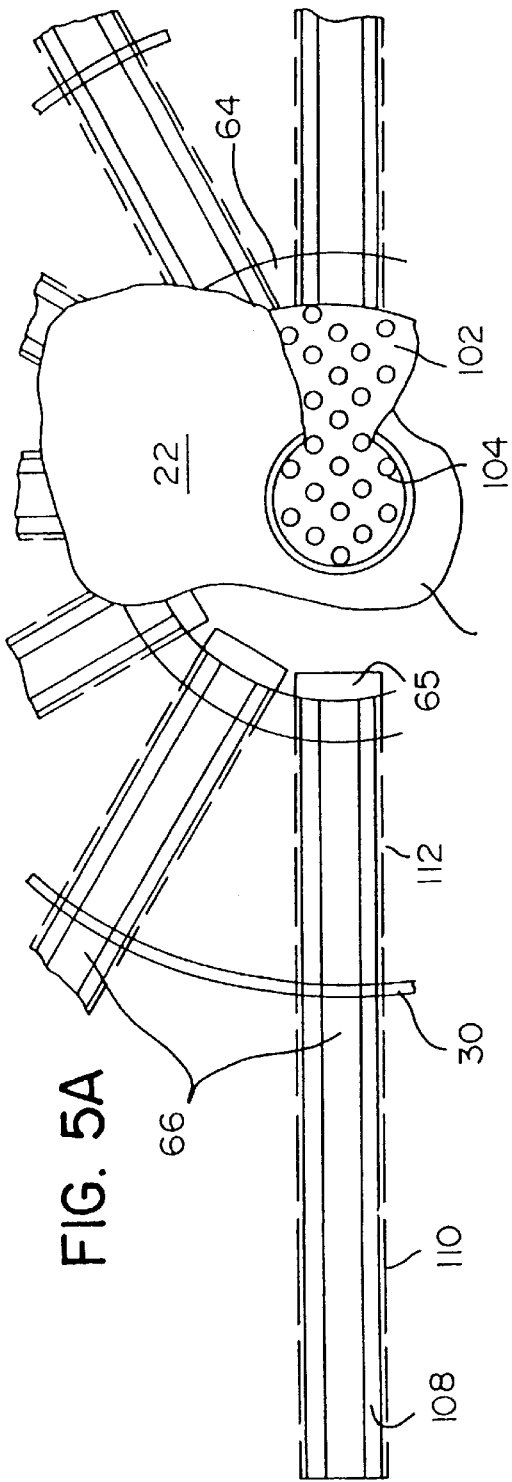
FIG. 5A
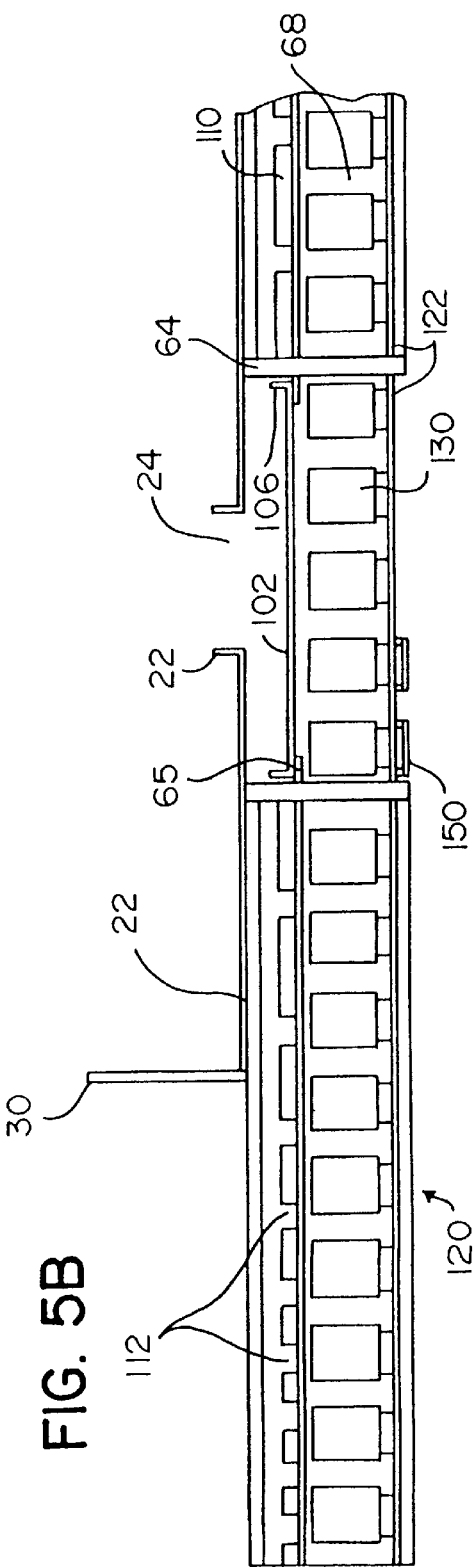
FIG. 5C
FIG. 5B

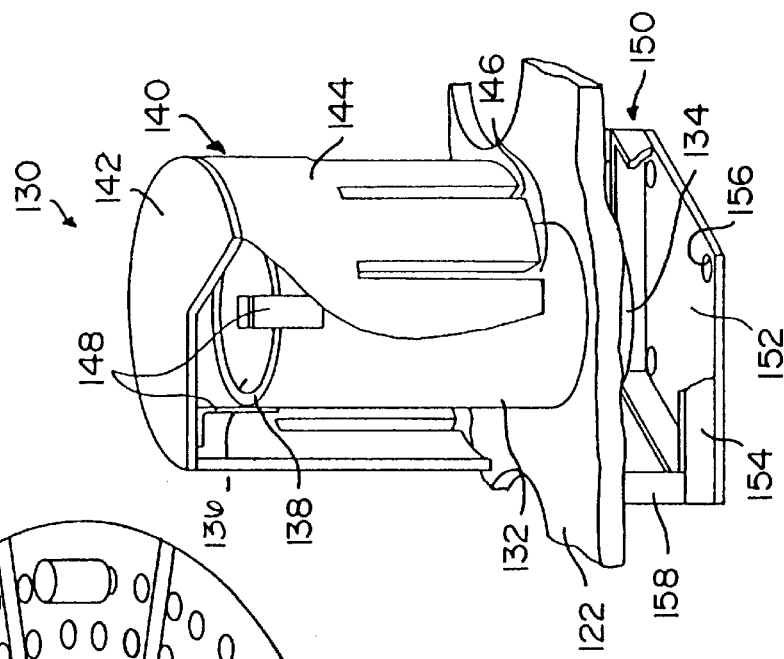
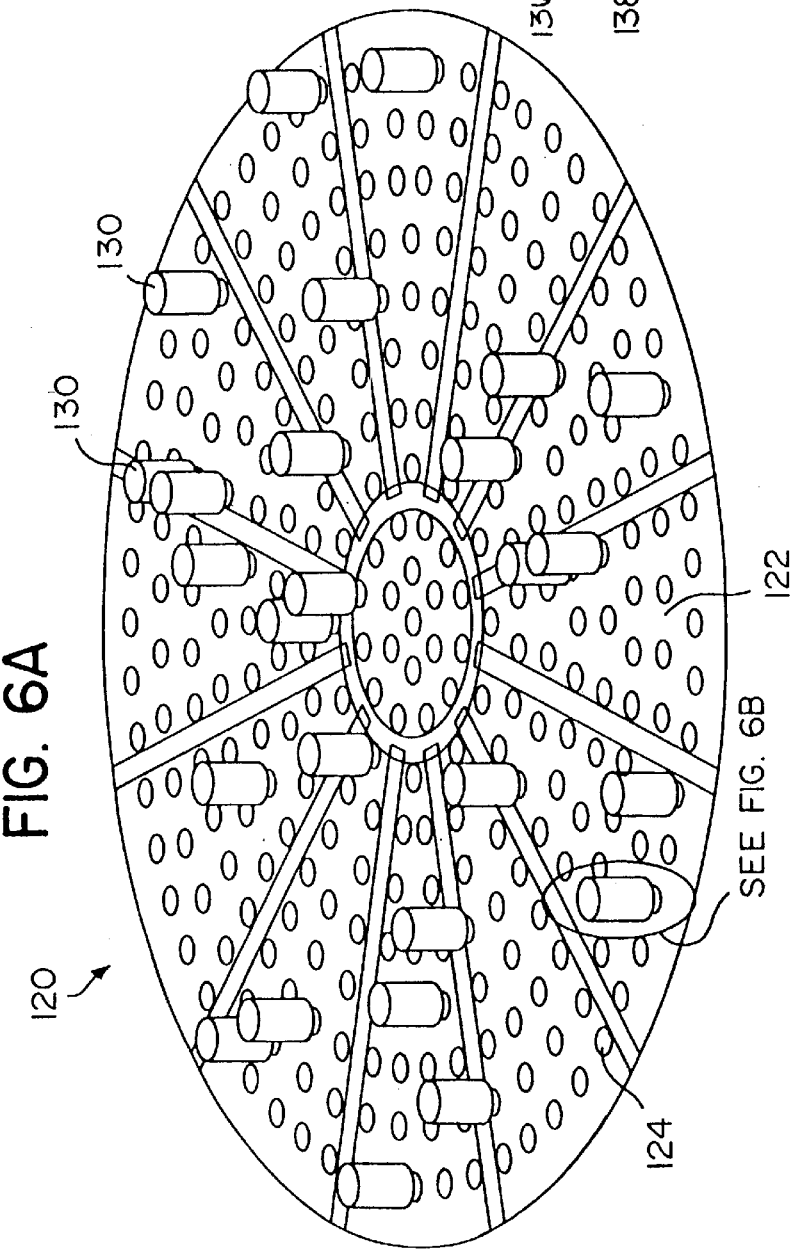

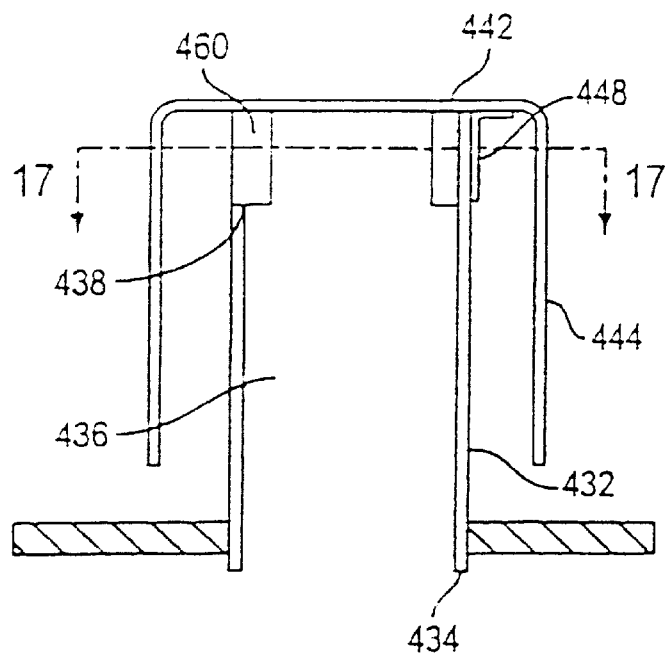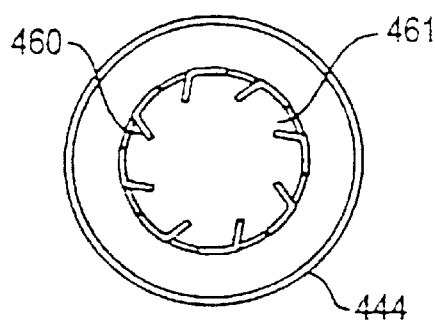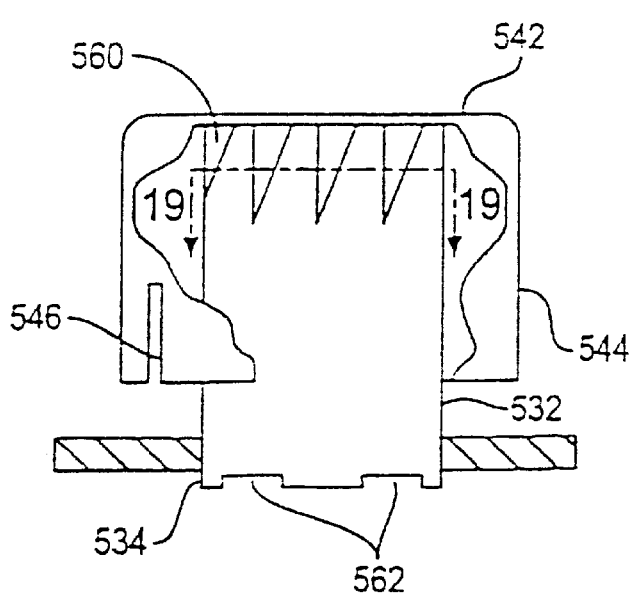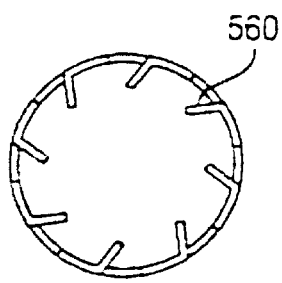

REACTOR DISTRIBUTION APPARATUS AND QUENCH ZONE MIXING APPARATUS

CROSS-REFERENCE TO RELATED APPLICATIONS

This is a continuation-in-part of a pending application, Ser. No. 08/659,122, filed Jun. 4, 1996, now U.S. Pat. No. 5,989,502.

BACKGROUND OF THE INVENTION

1. Field of the Invention

The present invention relates to a distribution apparatus and a quench zone mixing apparatus (or device) that may include the distribution apparatus, both of which are suitable for efficiently mixing and redistributing reactants across the horizontal cross-section of a vertical reaction vessel.

2. Discussion of Related Art

Many catalytic processes are carried out in reactors that contain a series of separated catalytic beds. Frequently, in such processes, quench zone mixing devices are advantageously located to provide rapid and efficient mixing of the fluid streams being processed in the reactor with a cooler fluid stream supplied from an external source. Consequently, the temperature of the process stream entering the successive catalyst beds can be controlled. One skilled in the art will appreciate that the better the mixing of the reactant streams, the better the temperature and reaction can be controlled. As a result, the overall performance of the reactor will be better.

Examples of quench zone mixing devices include U.S. Pat. No. 3,353,924, U.S. Pat. No. 3,480,407, U.S. Pat. No. 3,541,000, U.S. Pat. No. 4,669,890, and U.S. Pat. No. 5,152,967. Some of these devices are complicated and are prone to plugging. Others need a relatively large vertical space to ensure the desired degree of mixing. Still others create an undesirably high pressure drop. Consequently, there is a continuing need for a suitable quench zone mixing device that can efficiently mix fluid streams in a low vertical space with an acceptably low pressure drop.

Typically, the quench zone mixing devices are located above an associated fluid distribution system; for example, a horizontally disposed distribution plate or tray. The distribution plate collects the fluid (vapor and liquid), uniformly distributes it across the plate and discharges the fluid on to the catalyst bed. Such distribution tray may contain a number of "bubble cap" assemblies which may be disposed over one or more openings in the distribution tray. The bubble cap provides intimate mixing of the vapor and liquid before the mixed phase fluid is distributed across the catalyst bed.

Examples of distribution trays include U.S. Pat. No. 2,778,621, U.S. Pat. No. 3,218,249, U.S. Pat. No. 4,960,571, U.S. Pat. No. 4,836,989, U.S. Pat. No. 5,045,247, U.S. Pat. No. 5,158,714 and U.S. Patent No. 5,403,561. Although one or more of these designs may be acceptable, there is still room for improvement, particularly in providing a uniform distribution of vapor and liquid phases into contact with the catalyst in the reactor vessel.

SUMMARY OF THE INVENTION

It is an object of the invention to provide a distribution apparatus that includes a redistribution tray (also referred to herein as a "redistribution plate"). It is another object of the invention to provide a quench zone mixing apparatus (also referred to herein as the "quench zone mixing device") that includes a swirl chamber, a rough distribution network disposed underneath the swirl chamber, and, preferably, a distribution apparatus disposed underneath the rough distribution network. It is to be understood that the distribution apparatus can be associated with the quench zone mixing device or can be used separately from the quench zone mixing device; for example, at the top of the reactor vessel.

The distribution apparatus includes a redistribution plate (also referred to herein as a "plate") having a plurality of apertures and a plurality of bubble caps with at least some of the bubble caps associated with at least some of the apertures. In one embodiment, a plurality of drip trays are substantially horizontally disposed underneath the redistribution plate. At least some of the drip trays are associated with at least some of the bubble caps. The drip trays receive fluids exiting the associated bubble caps and distribute them through at least one discharge port provided on the bottom of the drip tray. In another embodiment, the drip trays have at least two discharge ports to multiply the fluid drip stream received from the bubble cap and symmetrically distribute the fluid across the catalyst surface.

Instead of the drip trays, at least one deflector baffle, and preferably a plurality of deflector baffles, may be placed below the redistribution tray. Preferably at least some of the deflector baffles are associated with at least some of the bubble caps.

As noted above, the quench zone mixing apparatus includes a swirl chamber. The swirl chamber is adapted to receive fluids from upstream in the reactor (such as those exiting a catalyst bed located above the swirl chamber). Preferably, the swirl chamber is substantially cylindrical. The swirl chamber includes a wall disposed between a ceiling and a floor. The wall has a plurality of openings, such as inlet openings, that provide a means of fluid communication into the swirl chamber. The floor surrounds an orifice, which provides a means for fluid to exit the swirl chamber. Preferably, a weir is provided about the periphery of the orifice. Baffles are located inside the swirl chamber which stabilize the vapor and liquid phase vortices, reduce the required overall height of the swirl chamber, provide a wide operating range for vapor and liquid throughput, and promote turbulence/mixing within each of the fluid phases. At least some of the openings have a baffle associated with the openings.

The rough distribution network is disposed beneath the swirl chamber to receive fluids from the swirl chamber. The rough distribution network includes a splash plate and radially outwardly extending channels. The splash plate is adapted to collect fluids from the swirl chamber and radially outwardly distribute them through the channels. Preferably, the channels include side walls with spaced apart notches to allow fluid to exit the channels. Fluids exiting the channels fall onto a distribution apparatus disposed beneath the rough distribution network.

Preferably, the distribution apparatus includes the redistribution plate substantially horizontally mounted below the rough distribution network and the swirl chamber. The redistribution plate extends substantially across the entire cross-section of the vessel to separate an upper section of the vessel from a lower section. The redistribution plate comprises a plurality of apertures and a plurality of bubble caps associated with the apertures of the redistribution plate. More preferably, a bubble cap is associated with each aperture to provide the sole means of fluid flow through the plate.

The bubble caps include a riser and a spaced apart cap. The riser has a top and a bottom and the riser is secured near the bottom to the redistribution plate. A passageway is defined between the top and bottom and provides a means of fluid communication across the redistribution plate. Preferably, the cap has a plurality of spaced apart slots to allow the flow of fluids through the cap and into the annulus defined by the cap and the riser.

In a preferred embodiment, the ceiling of the swirl chamber is closed. A liquid collection tray, preferably frusto-conically shaped, surrounds the swirl chamber and is sloped so that the one end adjacent the inlet openings is lower than the other end adjacent to the vessel wall. Fluid exiting the preceding catalyst bed falls onto the liquid collection tray or onto the ceiling of the swirl chamber where it is directed onto the liquid collection tray and through the inlet openings. Baffles are located inside the swirl chamber adjacent the openings and in communication with the openings to receive and direct incoming fluid circumferentially about the swirl chamber. In this preferred embodiment, the orifice is centrally located and provides the sole means for fluid to exit the swirl chamber. Additional baffles, i.e., wall baffles and internal baffles (the latter located on the floor of the swirl chamber), may also be included.

In another preferred embodiment, a quench fluid system is provided to introduce quench fluid into or above the swirl chamber. The quench fluid system may include a feed pipe in communication with a concentric manifold that surrounds the swirl chamber. A plurality of quench fluid laterals in fluid communication with the manifold extend radially inward and terminate with nozzles that extend into the swirl chamber. The nozzles are located adjacent and below the baffles and have openings to direct quench fluids into the fluid stream exiting the baffles.

Alternatively, the quench fluid system may include a feed pipe which introduces the quench fluid directly (without a manifold) into the swirl chamber or into an area above the swirl chamber.

In another embodiment of the present invention, a reactor is provided with the quench zone mixing apparatus of the present invention interposed between two catalyst beds. Preferably, the quench zone mixing apparatus is supported within a vessel of the reactor by a support structure that includes a concentric hub, which may be formed to act as a torsion tube, and at least a first set of radial beams extending radially outward from the hub and terminating at a support ring that is attached to the reactor vessel wall.

In particular, the radial beams comprise a flange that supports the redistribution tray and a web of the beams preferably includes a plurality of openings to allow the passage of fluids across the vessel. In addition, the webs also carry the channels. The radial beams also support the swirl chamber and, in the area between the wall of the swirl chamber and the vessel wall, the radial beams may have a vertical height that slopes downward from the vessel wall to the swirl chamber wall. Specifically, the radial beams at the swirl chamber wall have a vertical height at about the bottom of the openings on the swirl chamber wall and at the vessel wall the radial beams have a vertical height greater than at the swirl chamber wall. The liquid collection tray is provided on the top of the radial beams in the area between the swirl chamber wall and the vessel wall to create a downwardly sloping conical surface. As in other embodiments, the liquid collection tray is preferably frusto-conical shaped and it surrounds the swirl chamber.

Alternatively, a first set of radial beams having a single vertical height may be provided with a second set of radial beams located vertically above the first set. In this case, the top of the second set of radial beams is downwardly sloped in the same fashion as described above. In either case, the liquid collection tray collects fluid from the ceiling of the swirl chamber and from the catalyst bed above and directs it through the openings in the swirl chamber.

In a preferred embodiment, a first set of radial beams having a single vertical height is used to support the swirl chamber and distribution channels. Additionally, a support ring is attached to the outside wall of the swirl chamber at a location just below the inlet openings. A second support ring is attached to the vessel wall at a location approximately equal to the elevation of the swirl chamber ceiling. The liquid collection tray is provided on top of the support rings in the area between the vessel wall and the swirl chamber to preferably create a frusto-conical shape that directs fluids from the catalyst bed above toward the swirl chamber inlet openings. The ring at the wall provides support for the liquid collection tray and a sealing surface to prevent fluids from bypassing the swirl chamber.

The present invention also contemplates an improvement in known quench zone mixing devices wherein a rough distribution network is interposed between a mixing chamber (or a swirl chamber) and a distribution apparatus. The present invention therefore provides a reactor that includes the quench zone mixing apparatus of this invention, which comprises a mixing chamber and a distribution apparatus. In particular, the improvement comprises a rough distribution network disposed between the mixing chamber and the distribution apparatus, the rough distribution network comprising a splash plate in fluid communication with outwardly extending channels. Preferably, the channels extend outward radially from the splash plate. The splash plate preferably has apertures and the channels preferably include side walls with spaced apart notches to allow fluid to exit the channels.

The invention is also directed to a bubble cap which comprises: a riser having a lower end located within and extending through an aperture in a plate of the distribution apparatus and a top end to define a passageway between the ends, the passageway including an inlet and an outlet; a cap located over the top end of the riser, the cap having a top portion and a downwardly extending skirt portion; a spacer located between the riser and the cap to maintain a gap between the top end of the riser and the cap; and a deflector baffle placed below the outlet of the passageway.

The deflector baffle may have any desired construction, and it redirects the majority of the fluid flowing downwardly from the riser passageway, so that the fluid forms a relatively wide spray pattern over the downstream catalyst bed (as compared to the fluid flow pattern from a bubble cap without the deflector baffle).

Additionally, the invention is directed to a bubble cap comprising: a riser having a lower end located within and extending through an aperture in the plate of the distribution apparatus and a top end to define a passageway between the ends; a cap located over the top end of the riser, the cap having a top portion and a downwardly extending skirt portion; at least one spacer located between the riser and the cap to maintain a gap between the top end of the riser and the cap; and a plurality of riser vanes located between the top end of the riser and the top portion of the cap. An annulus ("bubble cap annulus") is created between the riser and the cap. The riser vanes are preferably flush against the underside of the bubble cap top wall. The riser vanes are spaced from each other to form vane passageways. Preferably, the vane passageways are the only (or sole) means of fluid communication between the bubble cap annulus and the riser passageway.

A bubble cap may also include the deflector baffle and the riser vanes.

The deflector baffle and/or the riser vanes (as described herein) may also be included in a bubble cap of any other construction.

The present invention also contemplates the use of a distribution apparatus where the distribution apparatus is not associated with the quench zone mixing apparatus i.e., the distribution apparatus is used in addition to the quench zone mixing apparatus or used in a reactor that does not have a quench zone mixing apparatus. In this embodiment, the distribution apparatus may be provided above a catalyst bed. For example, the distribution apparatus may be provided at the top of the reactor or between successive catalyst beds. The distribution apparatus will include a redistribution plate and a plurality of bubble caps, as described above. In addition, the distribution apparatus may also be provided with a plurality of drip trays, as described above. In another embodiment, the drip trays may be omitted and at least one deflector baffle included in the distribution apparatus, as described above. The riser vanes may be included in any of the bubble caps. In this embodiment, the distribution apparatus is usually called a "distribution tray".

The present invention also contemplates the use of a quench zone mixing apparatus in a process for contacting a first fluid with a second fluid, wherein the first and second fluids may be liquid and/or gas. Preferably, the process occurs in a portion of a reactor between two successive spaced apart beds of particle form solids, e.g., catalyst particles. In one embodiment, the invention broadly includes introducing a first fluid into the reactor; transporting the first fluid through a first catalyst bed; collecting the reaction product from the first catalyst bed and transporting it through the quench zone mixing device where it is further mixed and reacted with a quench fluid ("second fluid") to form a further reaction product that is distributed onto the surface of a second bed, including catalyst particles, located downstream from the first catalyst bed. In one particular application of this embodiment, hydrotreating and hydrocracking of relatively heavy petroleum hydrocarbon stocks, the first fluid is a hot mixture of gas and liquid and the second fluid is a cold gas or cold liquid.

In a particular embodiment, the process is directed to a two phase downflow reactor. The process includes introducing a first fluid, such as liquid and gas reactants, into the reactor at a location above a swirl chamber. Preferably, the first fluid is introduced in an upper section of the reactor. The first fluid is then introduced into the swirl chamber. A second fluid, e.g., a quench gas, is introduced into the swirl chamber and contacts the first fluid to form a swirl chamber fluid mixture. The swirl chamber fluid mixture exits the swirl chamber and is collected by a rough distribution network where the swirl chamber fluid mixture is radially distributed over a splash plate and outwardly extending channels. Subsequently, a fluid mixture exiting the channels is conducted to a distribution apparatus. The distribution apparatus includes a redistribution plate with a plurality of apertures and a plurality of bubble caps with at least some of the bubble caps associated with at least some of the apertures. The fluid mixture is transported through the redistribution plate to form a redistribution plate fluid mixture. The redistribution plate fluid mixture is eventually transported to a downstream section of the reactor.

In one embodiment of the process, a deflector baffle is associated with at least some of the bubble caps. Also, riser vanes may be included in at least some of the bubble caps.

In another embodiment of the process, before the redistribution plate fluid mixture is transported to the downstream section of the reactor, it is collected on a plurality of substantially horizontal drip trays with at least some of the drip trays which are located underneath the plate and associated with at least some of the bubble caps. The collected redistribution plate fluid mixture is distributed through at least one discharge port in the drip trays and some separation of the gas from the liquid takes place on the drip trays.

The invention is also directed to a process for transferring a fluid from a first bed of a reactor to a second bed of a reactor, located downstream from the first bed. The process comprises introducing a fluid from the first bed of the reactor into a swirl chamber. Subsequently, the fluid is removed from the swirl chamber, and is introduced into a rough distribution network including a splash plate and outwardly extending channels. Then, the fluid is conducted from the rough distribution network to a distribution apparatus, which includes a redistribution plate with a plurality of apertures and a plurality of bubble caps. At least some of the bubble caps are associated with at least some of the apertures. The fluid is then transported through the redistribution plate to the second bed of the reactor. The fluid may include a gas, a liquid or a mixture of liquid and gas. A quench fluid, liquid or gas, may also be introduced separately into the swirl chamber.

The invention is also directed to a process for redistributing a fluid within a reactor. The process includes collecting the fluid on a distribution apparatus and distributing the fluid to a downstream section of the reactor in a substantially even fashion across the cross-section of the reactor. The distribution apparatus includes a redistribution plate with a plurality of apertures and a plurality of bubble caps, with at least some of the bubble caps associated with at least some of the apertures. In one embodiment, a plurality of substantially horizontal drip trays are located underneath the plate and associated with at least some of the bubble caps. Consequently, the fluid is collected on the surface of the redistribution plate and transported through the plate, to a downstream section of the reactor. If the drip trays are included, the fluid is transported through the plate onto the drip trays where it is transported to a downstream section of the reactor. In another embodiment, a deflector baffle is associated with at least some of the bubble caps. Further, riser vanes may be included in at least some of the bubble caps.

The invention is also directed to a method of operating a swirl chamber which includes: a liquid collection tray; a wall disposed between a ceiling and a floor, the floor including an orifice which provides a means of communication out of the swirl chamber, the wall defining an inside of the swirl chamber; a plurality of openings (also referred to as "inlet openings"), in the wall, which provide a means of fluid communication into the swirl chamber; a plurality of baffles (or first baffles) located inside the swirl chamber and in communication with the openings to receive and direct incoming fluid circumferentially about the swirl chamber. The method comprises introducing a fluid into the swirl chamber through the openings and directing the fluid onto the first baffles; subsequently, the fluid is directed from the first baffles onto the floor and towards the orifice, in such a manner that at least one of the first baffles is partially submerged by the fluid.

The apparatus and process of the present invention may be particularly applicable for use in fixed bed catalytic processing systems for hydrotreating and hydrocracking of relatively heavy petroleum hydrocarbon stocks. Such processing systems may use reactors with one or more vertically spaced catalyst beds. Although the invention may be particularly applicable for use in hydrogen treatment of hydrocarbons, the process and apparatus are not limited to such use and can be used in any system where the mixture of a vertically flowing liquid and a vertically flowing gas, or a lighter liquid and heavier liquid, is desired. For example, the invention may also be used in aromatic saturation, catalytic dewaxing and hydrofinishing operations.

The quench zone mixing apparatus may be placed in any suitable location in a reactor vessel. For example, it may be placed at the top of the reactor, so that any fluid entering the reactor will contact the quench zone mixing apparatus before it contacts any other internal reactor devices. Alternatively, the quench zone mixing apparatus may be placed downstream from any internal reactor devices, such as internal catalyst beds.

For purposes of exemplification and illustration, a range of parameters is given below for some specific processing systems for hydrotreating and hydrocracking relatively heavy petroleum hydrocarbon stocks in which the apparatus and process of the present invention can be used. Such processing systems typically use reactors having inside diameters of 5 to 20 feet with about 2 to 5 vertically spaced catalyst bed spaces with lengths of 5 to 50 feet, and use catalysts typically having particle sizes of $1/32$ inch to $1/4$ inch.

As pointed out in greater detail below, the quench zone mixing apparatus of this invention provides important advantages. The design of the invention apparatus minimizes the overall vertical height of the quench zone mixing apparatus. As a result, the overall vertical height of the reaction vessel can be decreased, thereby reducing the capital cost of the vessel. At the same time, intimate mixing and thermal equilibration is achieved while maintaining only a moderate pressure drop across the device.

The term "fluid" as used in the specification and claims is meant to include both liquids and gases. The term "vapor" and "gas" are used interchangeably herein.

BRIEF DESCRIPTION OF THE DRAWINGS

FIG. 2C is a perspective view of a portion of the quench zone mixing and distribution apparatus showing a different embodiment of the apparatus. Several portions have been removed to better show the detail of the apparatus.

FIG. 2D is an end view of a radial support beam and distribution channel of the rough distribution network of the embodiment of FIG. 2C.

FIG. 2F is a schematic illustration of the top view of the liquid collection tray 78, including a portion thereof formed of integrated collection tray baffles.

FIG. 2G is a schematic illustration of a portion of the liquid collection tray 78, which includes integrated collection tray baffles of an alternative construction.

FIG. 3 is a perspective view of a portion of the swirl chamber of the quench zone mixing apparatus with several portions removed to show the detail of the swirl chamber. It is understood that the portion of the swirl chamber not shown is radially symmetrical to the portion shown.

FIG. 3A is a side view of an alternative embodiment of the underflow baffle 42B.

FIG. 4C is a schematic illustration of an alternative embodiment of the introduction of a quench fluid (or other fluid) into the circumferential baffle opening in the swirl chamber.

FIG. 5A is top view of a portion of the quench zone mixing apparatus to show further detail of the rough distribution network. It is understood that the portion not shown is radially symmetrical to the portion shown.

FIG. 5B is a partial cross-sectional view of a portion of the quench zone mixing apparatus to show further detail of the distribution channels and redistribution tray. It is understood that the portion not shown is radially symmetrical to the portion shown.

FIG. 5C is an end view of a radial support beam and distribution channel of the rough distribution network.

FIG. 6A is a perspective view of the redistribution tray used in the distribution apparatus of the present invention. For clarity, many of the individual bubble caps are not shown.

FIG. 6B is a perspective view of an individual bubble cap associated with an aperture of the redistribution tray of FIG. 6A and with its drip tray. Portions are cutaway to show the detail of the bubble cap and drip tray.

FIG. 16 is a cross-sectional view of an embodiment of a bubble cap having riser vanes.

FIG. 17 is a top view of a section of the FIG. 16 bubble cap taken along the view line 17—17 of FIG. 16.

FIG. 18 is a cut-away view of an embodiment of a bubble cap including an alternative design of riser vanes.

FIG. 19 is top view of a section of the FIG. 18 bubble cap taken along the view line 19—19.

DETAILED DESCRIPTION OF THE INVENTION AND PREFERRED EMBODIMENTS

The quench zone mixing apparatus invention will now be described with reference to its use in a multi-bed, catalytic reactor in which the apparatus is located in a zone between two catalytic beds. It is understood by one skilled in the art that the apparatus of the present invention can also be used in non-catalytic vessels or reactors.

Figure 1:
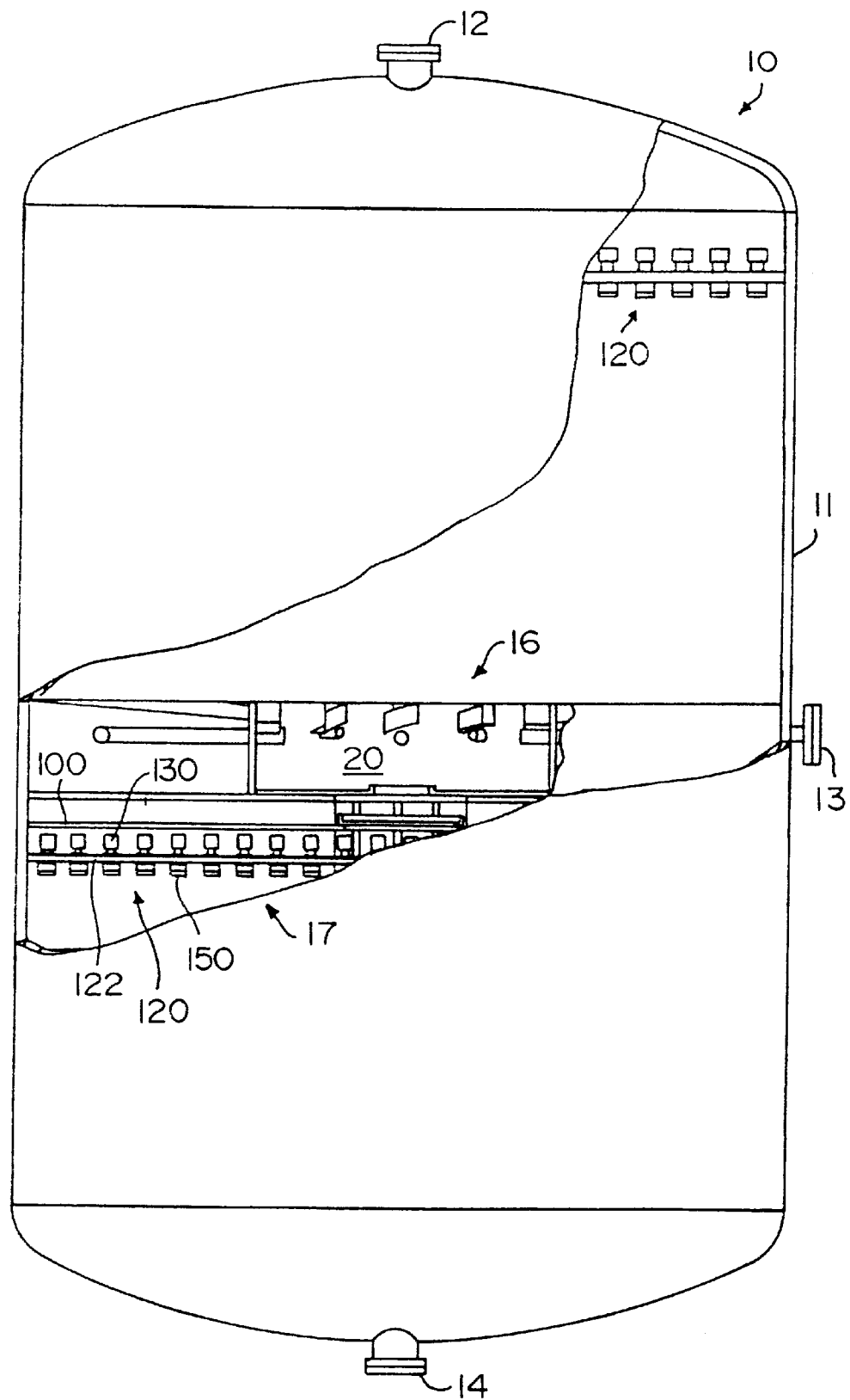
FIG. 1 shows a multi-bed catalytic reactor with a portion cut away to show a vertical section view of a portion of the distribution apparatus and the quench zone mixing apparatus of the present invention.

As shown in FIG. 1, the reactor 10 comprises a cylindrical vessel. While the vessel is preferably substantially cylindrical, it can also have any shape that is suitable for manufacturing concerns. The vessel is typically constructed of corrosion resistant metal or an equivalent material such as stainless steel, weld overlayed chrome alloy steels, or the like. The vessel is normally insulated internally or externally for operation at elevated temperatures.

Typically, an inlet 12 is provided in the vessel at its top portion for convenience in filling the vessel with catalyst, for routine maintenance, or for flow of fluid, as dictated by the particular application. An outlet 14 is provided in the vessel at its bottom portion to permit the discharge of the fluid product. Fluid quench is typically admitted to the vessel through a side wall nozzle 13 connected to a quench feed pipe. Alternatively, quench fluid may be introduced through the top or bottom of the reactor.

A cut-away portion 17 illustrates a partial vertical section view of the distribution apparatus and the quench zone mixing apparatus. Interposed between one or more successive catalyst beds is the quench zone mixing apparatus 16 of the present invention. The apparatus includes a swirl chamber 20, a rough distribution network 100 and, preferably a distribution apparatus 120.

The swirl chamber 20 receives and mixes a quench fluid, typically from an external source, with a reactant process fluid stream ("process fluid", "process stream" or "reactant fluid") exiting from the catalyst bed above. The quench fluid may have a temperature different from the process fluid and may be introduced to control the temperature of the process fluid. The quench fluid may also be added to adjust the composition of the process stream.

The rough distribution network (or system) 100 collects a product stream from the swirl chamber ("swirl chamber product stream") and radially outwardly distributes it to the distribution apparatus. The distribution apparatus 120 includes a redistribution plate 122 (or a plate 122), a number of bubble caps 130, and a number of associated drip trays 150. When the distribution apparatus is a part of the quench zone mixing apparatus, the distribution apparatus collects the fluid from the rough distribution system and the swirl chamber. The fluid is then further mixed by mutual entrainment of the gas and liquid in the bubble caps. The fluid stream exiting the bubble caps is subdivided by the drip trays associated with individual bubble caps to provide a substantially symmetrical and uniform flow distribution of fluid across the catalyst surface.

As also shown in FIG. 1, the distribution apparatus 120 described above need not be associated with the quench zone mixing apparatus but may be provided in the reactor, e.g. near the top of the reactor to provide for uniform flow distribution to a downstream section of the reactor. When the distribution apparatus is provided in this manner, it will collect fluid from above, further mix the fluid, and uniformly distribute the fluid.

Figure 2:
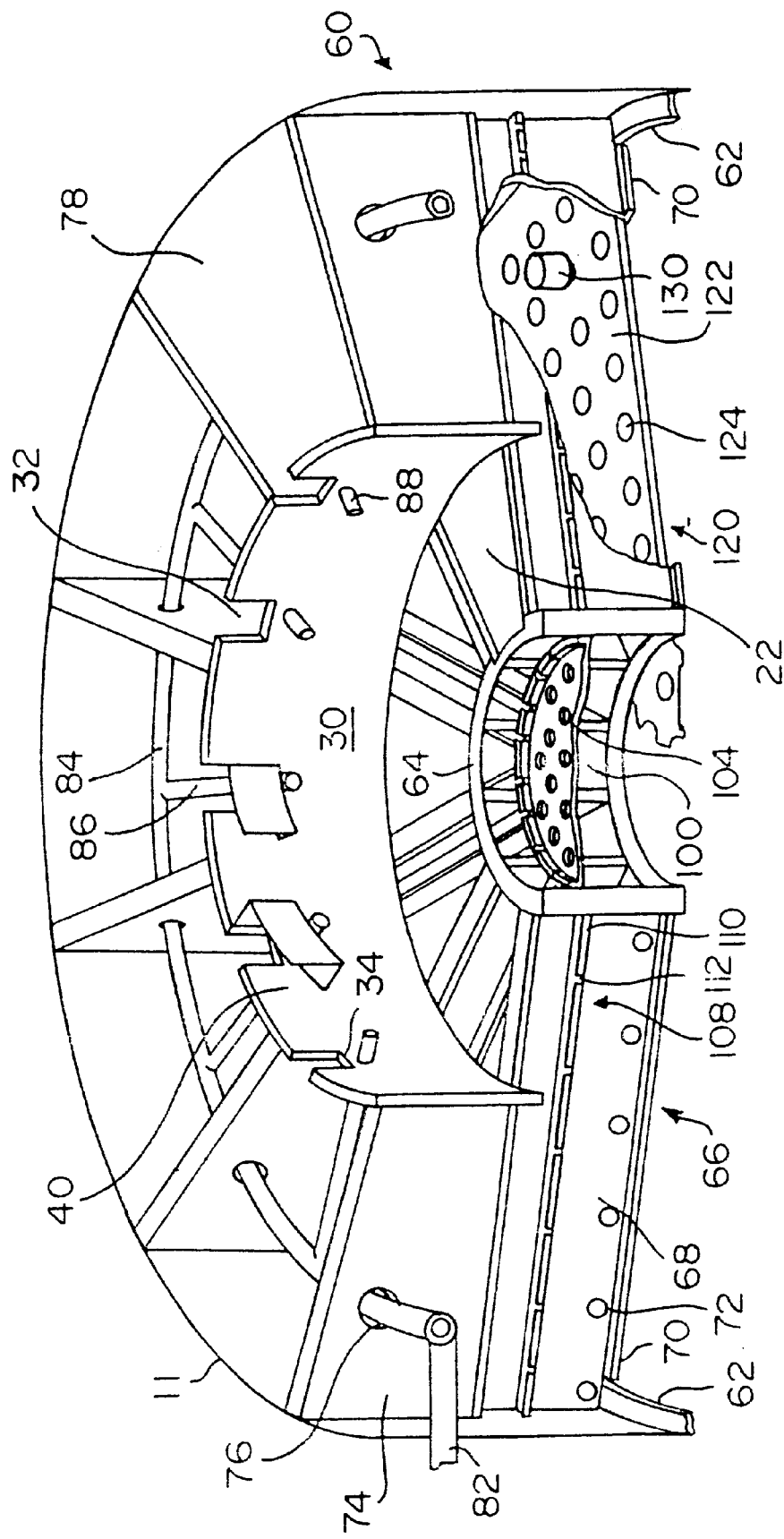
FIG. 2 is a perspective view of a portion of the quench zone mixing and distribution apparatus with several portions removed to better show the detail of the apparatus. It is understood that the portion of the quench zone mixing apparatus not shown is radially symmetrical to the portion shown.

Referring now to FIG. 2, a portion of the quench zone mixing apparatus of the present invention is shown. The apparatus fills substantially the entire cross-section of the vessel and is supported by a support structure 60. The support structure has the shape of a wagon wheel with a central hub and radial support beams as spokes. The entire structure is supported in the reactor by a single support ring 62, secured to the inside of the vessel wall by welding, forging or other means. The radial support beams lower flanges 70 are notched at the wall end so a web 68 of the radial support beams 66 will fit on the support ring. The top of the support beam lower flange 70 and the top of the wall support ring 62 are at the same elevation to facilitate installation and sealing of the redistribution tray. The support beams can be bolted to positioning lugs (not shown) attached to the wall to provide stability. A central hub 64, concentric with the reactor, may be sized as a manway for maintenance in the vessel. A first set of radial beams 66 extends radially outward from the central hub to the support ring 62. The radial beams 66 have a flange 70 for supporting the redistribution plate 122. Preferably, each beam 66 is I-shaped and its web 68 has a number of openings 72 near the redistribution plate to allow the transverse passage of fluids around the reactor.

Figure 2A:
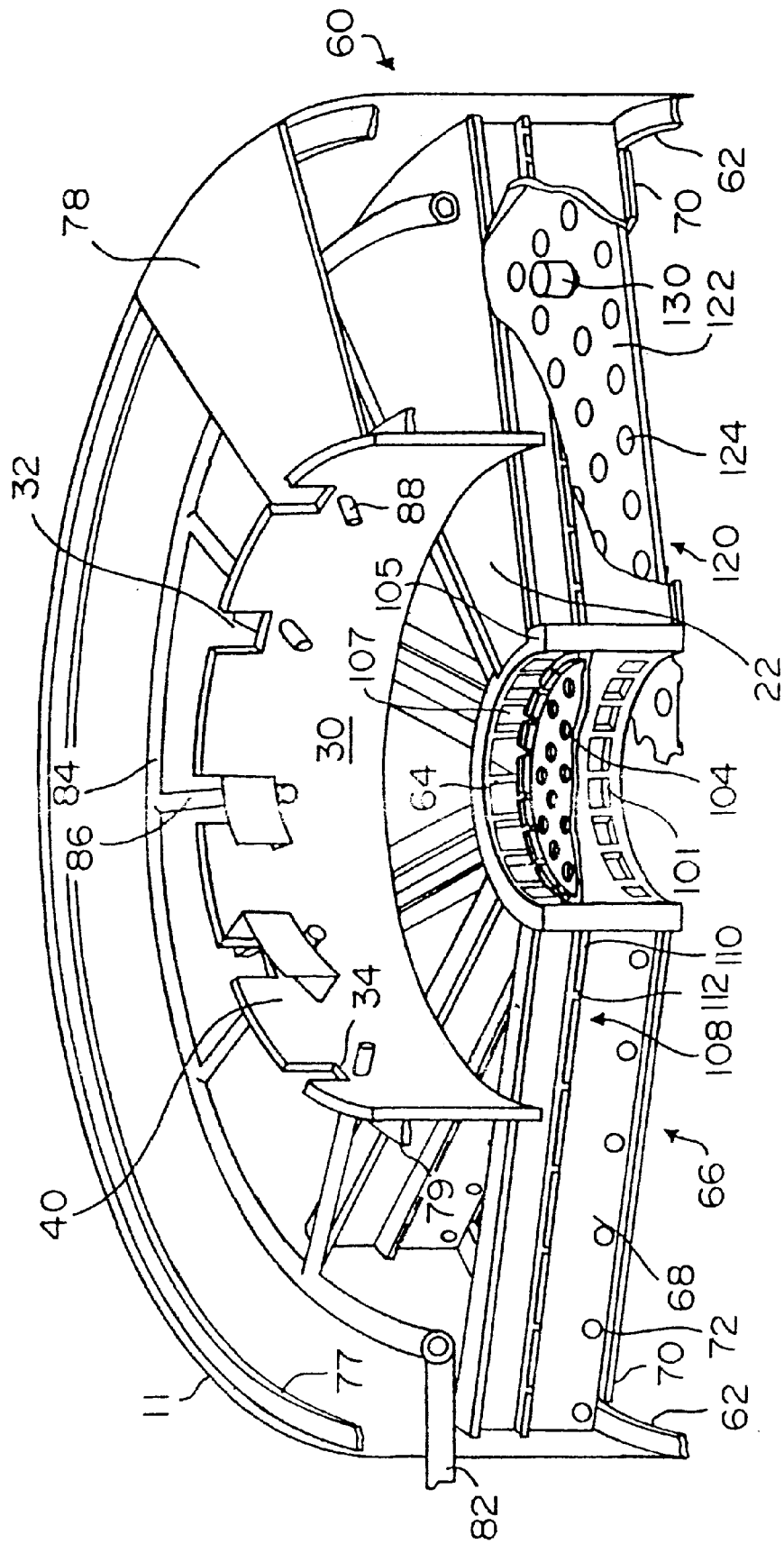
FIG. 2A is a perspective view of a portion of the quench zone mixing and distribution apparatus showing a different embodiment of portions of the quench zone mixing apparatus. Several portions have been removed to better show the detail of the apparatus.
Figure 2B:
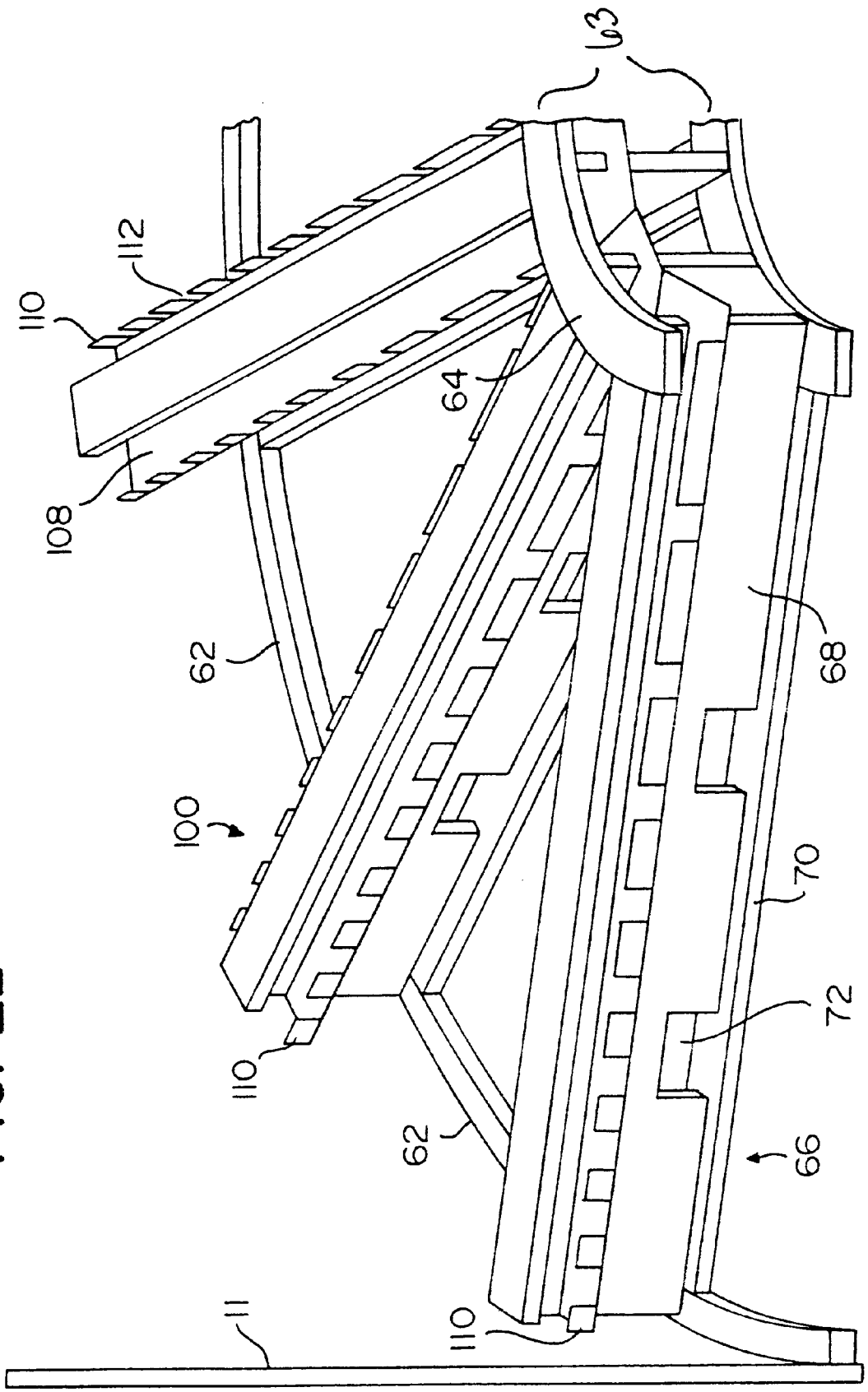
FIG. 2B is a perspective view of a portion of the quench zone mixing and distribution apparatus showing yet another different embodiment of portions of the quench zone mixing apparatus. Several portions have been removed to better show the detail of the apparatus.

The central hub may be constructed of any suitable materials. For example, it can be comprised of hub rings 63, as illustrated in FIG. 2B, an annulus 105, which may include internal hub rings, as illustrated in FIG. 2A, or of one or more torsion tubes (each having a cylindrical shape) extending substantially from top to bottom of radial beams (not illustrated in the drawings). If a torsion tube design is used, the end of the support beams is attached to the torsion tube or tubes. The construction of the hub illustrated in FIG. 2 is preferred.

Figure 4A:
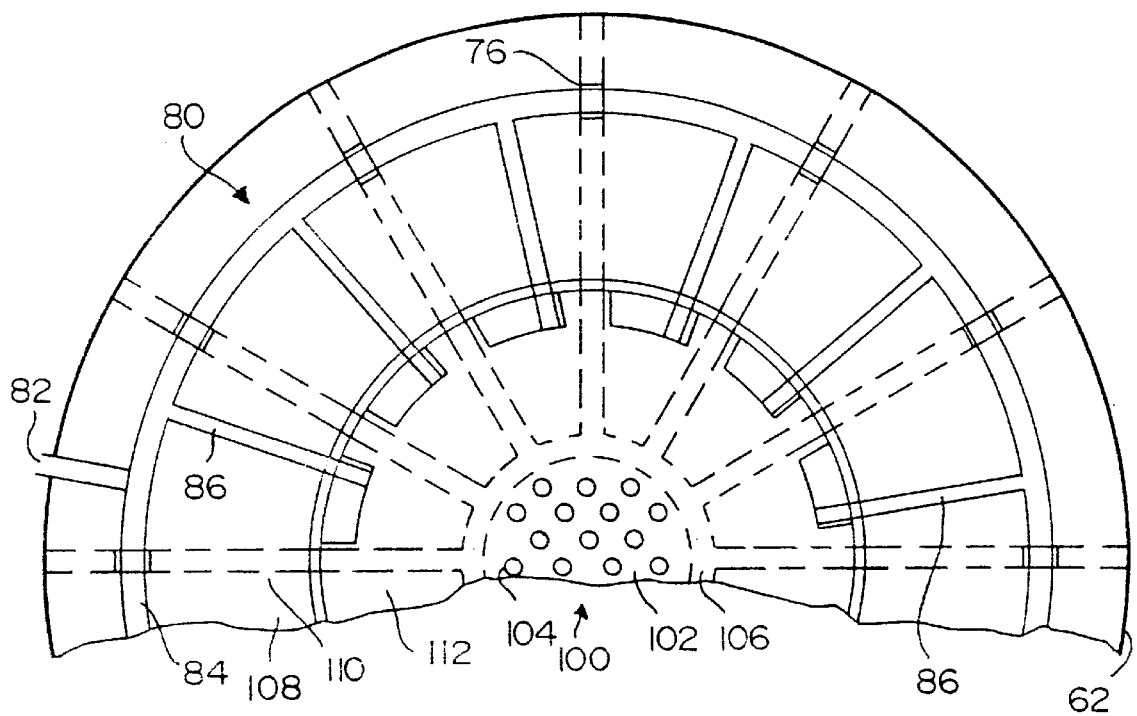
FIG. 4A is a top view of a portion of the quench zone mixing apparatus to show the quench fluid system. It is understood that the portion of the quench fluid system not shown is radially symmetrical to the portion shown.
Figure 4B:
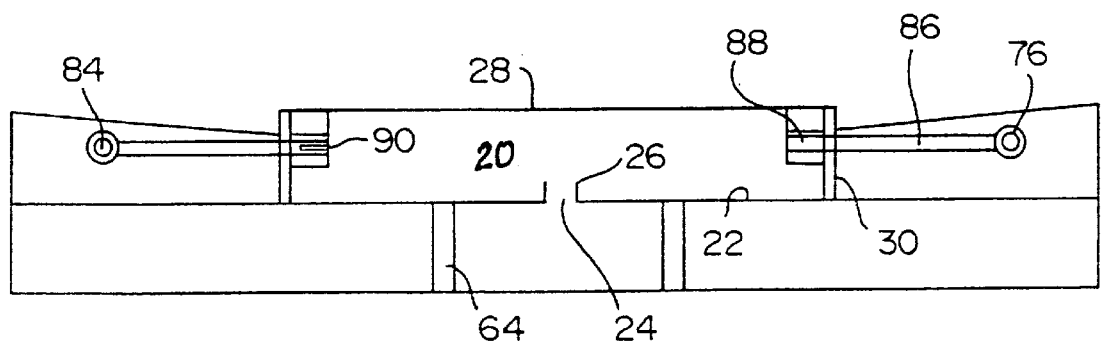
FIG. 4B is a cross-sectional view of a portion of the quench fluid system.

Referring now to FIG. 3, a squat swirl chamber 20 is supported by the support structure. Preferably, the swirl chamber is cylindrical. The swirl chamber has a floor 22 and an orifice 24. Preferably, the floor consists of a solid plate surrounding a central orifice 24. A round weir 26 rises above the orifice 24 to define a shallow basin on the floor inside the swirl chamber. The swirl chamber has a ceiling 28 that preferably consists of a solid plate (best seen in FIG. 4B). A section of the swirl chamber ceiling and floor may be constructed so that they can be removed to serve as a manway for maintenance purposes. The side wall 30 (also referred to herein as the "wall" or "swirl chamber wall") of the swirl chamber cylinder is solid except for a number of openings 32 spaced around the circumference and located just below the ceiling. Preferably, the openings are evenly spaced around the circumference of the chamber and have a parallelogram shape and, more preferably are rectangular. Most preferably, the openings are square. In the most preferred embodiment, the openings provide the sole means for a fluid from an upstream section of the reactor to enter the swirl chamber. The upstream section of the reactor may include a catalyst bed.

As shown in FIG. 2, a second set of radial beams 74 extends radially outward from the swirl chamber wall toward the reactor wall 11. Preferably, they are located on top of and are fastened to the first set of radial beams 66 to provide a rigid structure. Alternatively, a single beam (or a single set of beams) with the same profile as the two beams could be used (e.g., see FIG. 2C). Throughout the specification, while specific reference is made to a second set of radial beams, one skilled in the art will appreciate that a single beam can be equivalently used. The second set of radial beams is taller at the reactor wall than at the swirl chamber. At the swirl chamber wall, the beams have substantially the same height as the bottom of the openings on the wall of the swirl chamber. As a result, the top of the second set of beams is downwardly sloped.

In a preferred embodiment shown in FIG. 2A, the second set of radial beams can be replaced by a first ring 79 attached to the outside wall of the swirl chamber adjacent the bottom 34 of the openings 32 and a second ring 77 attached to the reactor wall at a higher elevation than the first ring. More preferably, the second ring 77 is attached at an elevation about equal to the ceiling of the swirl chamber. In this embodiment, the central hub 64 includes an annulus 105, extending from the top to the bottom of the hub. The annulus comprises openings 107 which enable fluid to flow out to the distribution channels and then onto the redistribution plate, below the splash plate. The annulus may include internal hub rings (not shown in FIG. 2A). Openings 101 are provided to allow fluid to flow into or out of the central hub, and to allow for fluid communication between the central and peripheral areas of the redistribution tray. The openings 101 and 107 may have any desired shape and/or size. Furthermore, the openings 101 may be spaced a larger distance from each other than shown in FIG. 2A. The openings 107 may also be spaced a longer distance from each other than shown in FIG. 2A. Also, the spacing of the openings 101 and 107 need not be as symmetrical or regular as shown in FIG. 2A. Two adjacent openings may be spaced a larger distance (e.g., several inches), while the next consecutive opening may be closely adjacent to the preceding opening. In the embodiment of FIG. 2A, elements of the apparatus corresponding to the elements in other illustrated embodiments are designated by the same reference numbers. The construction and function of various elements of the embodiment of FIG. 2A will be apparent to those skilled in the art from the discussion of the remaining embodiments.

As will be discussed in more detail below, where two sets of beams are provided, an opening 76 is provided in the second set of radial beams to allow passage of the quench fluid manifold. Where only a single beam is provided, an opening is provided in the upper portion of the beam to allow passage of the quench fluid manifold (see FIG. 2C). In the preferred embodiment having a first and second ring, there is no obstruction for the quench fluid manifold.

A liquid collection tray 78, preferably frusto-conical shaped, is formed by attaching solid plate tray sections (or panels) to the top of the second set of radial beams. Of course, if feasible, a single plate may be fastened to the top of the second set of beams. Of course, where only a single beam is provided, the tray 78 will be fastened to the top of the beam. Similarly, where a first and second ring are provided as in the preferred embodiment, the outer portion of the tray is fastened to the second ring while the inner portion is fastened to the first ring.

Since the tray will be sloped, it will form a conical frustum with a trough against the wall of the swirl chamber. Reactants dropping on the liquid collection tray 78 from above flow toward the openings 32 in the wall of the swirl chamber. In the central area of the reactor, reactants drop onto the ceiling 28 of the swirl chamber and flow radially outward over the edge and into the trough. Reactants flow from the trough into the swirl chamber through the openings. The reactants dropping onto the liquid collection tray and flowing into the swirl chamber include liquid and vapor reactants.

The sloped liquid collection tray reduces the residence time for liquid and vapor on the tray. The reduced residence time consequently reduces the thermal cracking of the liquid and vapor, coking and the formation of precursors of polynuclear aromatics.

Figure 2E:
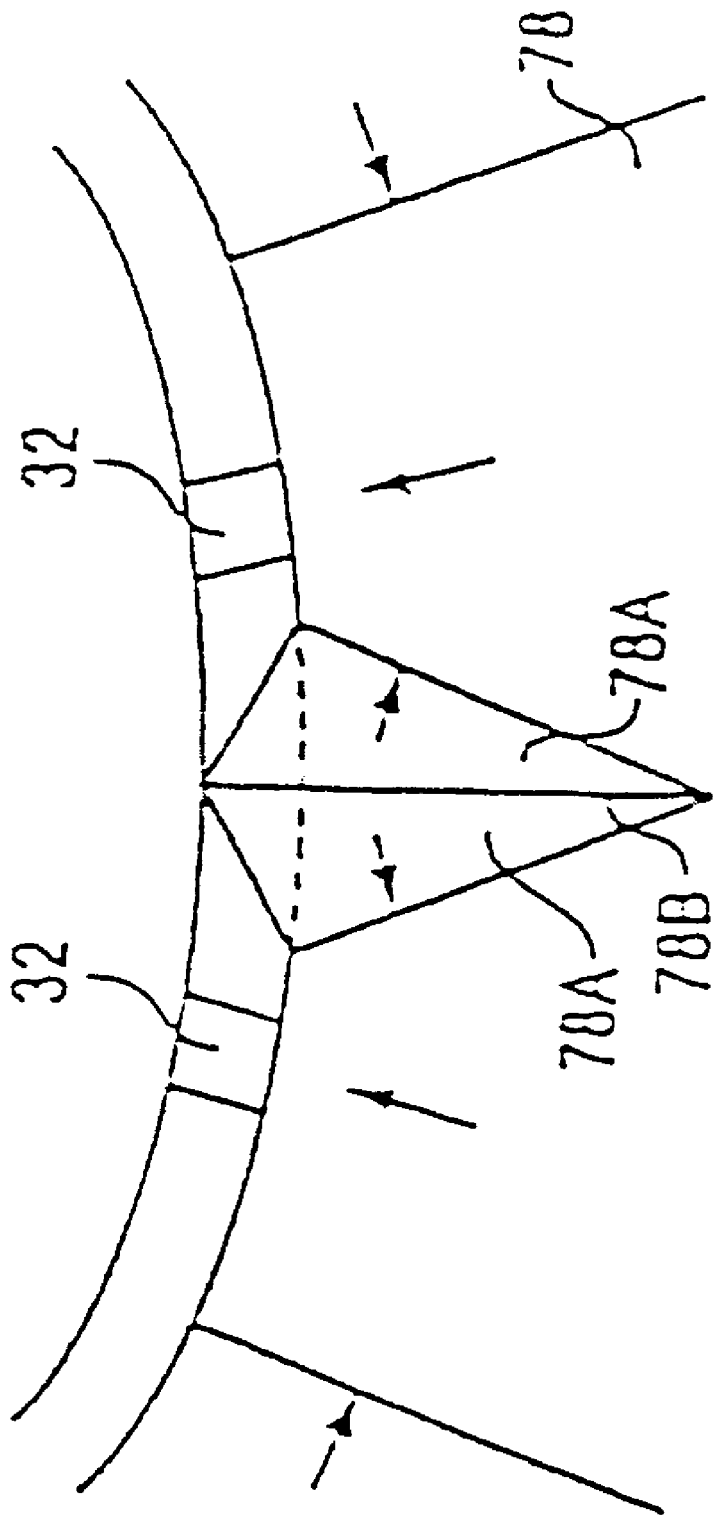
FIG. 2E is a perspective view of a portion of the liquid collection tray, which includes an alternative design of the tray.

In an alternative embodiment (illustrated in FIG. 2E) at least a portion of the liquid collection tray 78 may be constructed of the solid plate tray sections which include(s) ridged sloped panels 78A to further reduce the residence time for the fluid, which includes liquid and vapor, on the tray. That is, at least one of the solid plate tray sections includes a ridged sloped panel 78A. The ridged sloped panels 78A may be placed at any suitable location on the liquid collection tray. The ridged sloped panels 78A are integrated into the solid plate tray sections (or into the single plate). Preferably, the ridged sloped panels 78A are machined integrally with the solid plate tray sections (or the single plate). The panels 78A would be arranged such that the ridge 78B between two adjacent panels would be located radially substantially midway between two respective inlet openings 32. The apex of the ridgeline would be no higher than either the ceiling of the swirl chamber 28 or the point of intersection of the liquid collection tray 78 with the reactor wall 11. As such, the ridged sloped panels would not influence the overall vertical height required for the installation of the quench zone mixing apparatus.

In yet another alternative embodiment, the liquid collection tray 78 may be constructed with collection tray baffles 78C located (or included) on the upper surface of the liquid collection tray (FIGS. 2F and 2G). The collection tray baffles may be integrated into the liquid collection tray, e.g., during manufacturing of the liquid collection tray, or they may be attached to the liquid collection tray after the latter is manufactured. The collection tray baffles 78C may be of various shapes including, but not limited to, flat, V-shaped, scallop-shaped and U-shaped. The collection tray baffles are preferably spaced from each other. The degree of spacing will depend on design criteria. Nonetheless, the collection tray baffles may also be in contact with each other. FIG. 2F illustrates schematically the liquid collection tray having V-shaped collection tray baffles on one of its sections with an open end of the "V" facing toward the swirl chamber wall 30. FIG. 2G illustrates schematically a single section of the liquid collection tray having U-shaped collection tray baffles with an open end of the "U" facing toward the swirl chamber wall 30. Of course, either any desired portion(s) of the liquid collection tray or the entire liquid collection tray may include collection tray baffles. Also, a single liquid collection tray may include collection tray baffles of different shapes on different solid plate tray sections. The collection tray baffles 78C promote mixing of the reactant liquid and/or vapor which has fallen onto the tray from the catalyst bed above. This mixing will aid in the dissipation of hot zones due to a non-uniform flow through the catalyst bed above, e.g. due to channeling.

The collection tray baffles 78C would tend to increase the residence time for liquid on the tray and, therefore, would preferably be used in lower temperature hydroprocessing applications having relatively high superficial liquid rates, where increased residence time is not detrimental to product quality. Nonetheless, the collection tray baffles may be used in any other applications where the apparatus of this invention may be utilized.

FIG. 2B illustrates a perspective view of a portion of the quench zone mixing apparatus showing a modified embodiment thereof. For example, in the embodiment of FIG. 2B, the size and shape of the openings 72 is somewhat different than in the other embodiments. It will be apparent to those skilled in the art that, in the embodiment of FIG. 2B, elements of the apparatus corresponding to the elements in other illustrated embodiments are designated by the same reference numbers. The construction and function of various elements of the embodiment of FIG. 2B will be apparent to those skilled in the art from the discussion of the remaining embodiments of the invention.

FIGS. 2C and 2D illustrate a perspective view of a portion of the quench zone mixing apparatus showing yet another modified embodiment thereof. In this embodiment, a single set of radial beams 66A is used instead of the first set of radial beams 66 and the second set of radial beams 74 of the embodiment of FIG. 2. In this embodiment, the radial beams 66A include a web 68A. It will be apparent to those skilled in the art that, in the embodiment of FIGS. 2C and 2D, elements of the apparatus corresponding to the elements in other illustrated embodiments are designated by the same reference numbers. The construction and function of various elements of the embodiment of FIGS. 2C and 2D will be apparent to those skilled in the art from the discussion of the remaining embodiments of the invention.

As best seen in FIG. 3, inside the swirl chamber, baffles 40 are provided at each opening 32 (also referred to herein as an "inlet opening") to cause the incoming flow to turn 90 degrees or tangent to the swirl chamber wall so that the fluid flows circumferentially downward. Each baffle includes a downwardly angled tangential ramp 42 having an edge 44 attached to the wall of the swirl chamber adjacent the bottom 34 of the opening. Preferably, the opening of the ramp into the swirl chamber is substantially rectangular or square with the edge 44 of one of its sides attached to the swirl chamber wall 30. The opposite or distal side 46 of the tangential ramp 42 has an impinging wall 48 extending upward and joined to an end wall 50 and to an underflow baffle 42B that extend substantially normal to the impinging wall. The end wall extends upward from the ramp and one edge 52 of the end wall may be attached to the swirl chamber wall. The impinging wall 48 can be either flat or curved parallel to the swirl chamber wall 30. The edge between the impinging wall 48 and the tangential ramp 42 is, in either case, sealed to prevent leakage. The top edges of the impinging wall 48, the underflow baffle 42B, and the end wall 50 should fit flush against the swirl chamber ceiling to minimize leakage past the baffles. The side edges of the underflow baffle 42B should fit flush against the swirl chamber wall and the impinging wall 48 to minimize leakage past the baffles.

In an alternative embodiment, the lower portion of the underflow baffle 42C may be curved forward (i.e., in the direction of fluid flow), thereby creating a chute through which the fluids will pass (FIG. 3A). This curvature allows for higher fluid velocities in comparison with a sharp-edged underflow baffle, due to reduced viscous energy dissipation.

In another alternative embodiment, at least one additional wall baffle 50A and at least one internal baffle 50B, not associated with each inlet opening 32, may be incorporated in the design. The wall baffles 50A are attached to the swirl chamber wall 30, extending substantially vertically from near the swirl chamber floor 22 to near the swirl chamber ceiling 28. The wall baffles 50A extend radially inward from the swirl chamber wall 30. The wall baffles 50A may be oriented perpendicular to the swirl chamber floor 22 and ceiling 28 or at any angle to the swirl chamber floor 22 and the ceiling 28, such as that of the tangential ramp 42. In one embodiment, internal baffles 50B extend substantially vertically from near the swirl chamber floor 22 to near the swirl chamber ceiling 28.

Internal baffles 50B are preferably radially oriented, with the side edges normal to the swirl chamber wall 30, and the weir 26. Internal baffle 50B may be oriented perpendicular to the swirl chamber floor 22 and ceiling 28 or at any angle to the swirl chamber floor 22 and the ceiling 28, such as that of the tangential ramp 42.

Internal baffles 50B (and wall baffles 50A) may have any desired size (or shape). Further, some wall baffles 50A may have a different size and shape than other wall baffles 50A. Similarly, some internal baffles 50B may have a different size and shape than other internal baffles 50B. Also, not all of the wall baffles 50A and internal baffles 50B have to be oriented in the same direction (or at the same angle). Some of the wall baffles 50A may be oriented in a different direction and/or at a different angle than other wall baffles 50A. Some of the internal baffles 50B may be oriented in a different direction and/or at a different angle than other internal baffles 50B.

The tangential ramp 42 and the impinging wall 48, in conjunction with the swirl chamber wall 30 and the swirl chamber ceiling 28, therefore define a circumferential opening 54. The circumferential opening from each baffle (or tangential ramp) is in the same direction, e.g., counter-clockwise when viewed from above as in FIGS. 2 and 3, to cause the fluid to flow circumferentially, or swirl around the swirl chamber. The circumferential opening may, of course, be positioned in a clockwise direction, if desired. Exiting the circumferential opening, the vapor and liquid phases of the fluid tend to disengage due to the differences in their densities. Those skilled in the art will understand that the separation of the vapor and liquid phases is not complete; thus some of the vapor phase may be entrained in the liquid phase and some of the liquid phase may be entrained in the vapor phase. Both phases tend to form vortices, with the vapor phase vortex above that of the liquid phase; the interface between these vortices being designated as the "free surface," discussed below. The distance from the lower edge 42A of the tangential ramp 42 to the floor of the swirl chamber 22 is dimensioned so that, utilizing the inlet pressure drop/velocity head (the latter also referred to as "distance ratio," both discussed below), at least one of the baffles and, in particular, the impinging wall 48 of at least one of the baffles, is partially submerged in the swirling liquid phase vortex. Preferably most or all of the baffles, and, in particular, the impinging walls 48 of such baffles are partially submerged in the swirling liquid vortex. The term "partially submerged", as used herein, means that at least some, but not all, of the vertical height of a particular element (such as the baffles or the impinging wall 48) is submerged in the swirling liquid phase vortex. In this manner, the impinging wall 48 and the tangential ramp 42 serve as mixing baffles, which promote turbulence in the swirling vortices.

The wall baffles 50A and internal baffles 50B, if included, also serve as mixing baffles, which promote turbulence in the swirling vortices. At least one of the wall baffles 50A and at least one of the internal baffles 50B is also partially submerged in the swirling liquid vortex. Preferably most or all of the wall baffles 50A and internal baffles 50B are partially submerged in the swirling liquid vortex. The swirling effect and induced turbulence ensure good mixing with the other fluid streams from the other tangential ramps. The baffles also reduce the overall vertical height of the swirl chamber apparatus as they serve to limit the elevation, i.e., the vertical distance above the swirl chamber floor 22, at which the free surface forms. This limiting of the free surface elevation also provides the swirl chamber with the flexibility to handle wide variations in liquid and vapor throughput. The ratio of the vertical distance between the lower edge 42A of the tangential ramp 42 (FIG. 3) and the swirl chamber floor 22 to the diameter of the swirl chamber ("distance ratio") is about 0.01 to about 0.30, preferably about 0.025 to about 0.25, and most preferably about 0.05 to about 0.2.

In operation, the swirling fluid flows in a spiral manner toward the center of the swirl chamber, as it is displaced by additional fluid flowing down the tangential ramps. At the center, the fluid spills over the weir 26 to exit the swirl chamber. Sufficient pressure drop is taken across the opening 32, under the underflow baffle 42B, and down the tangential ramp to provide the fluid with enough velocity head to achieve effective mixing in the fluid pool of reactants inside the swirl chamber.

Without wishing to be limited by any theory of operability, it is believed that maintaining two parameters within certain limits is important to ensure that the impinging wall 48 is partially submerged by the liquid phase vortex, and that the wall baffle 50A, if used, also serves as a mixing baffle. These parameters are: (1) the distance ratio; and (2) the pressure drop across the opening 32. Suitable ranges of the distance ratio are discussed above. The pressure drop across the opening 32 may typically range from about 0.1 psi to about 2.0 psi, and is preferably less than about 1.0 psi.

The formation of the vapor and liquid phases vortices is desirable and preferred. While the vortices are not necessary for operating the swirl chamber of this invention, the operation under such conditions where the vortices are not formed is not preferred because it is believed to result in less than optimum performance of the device.

In reactors where quench fluid is used to cool the reactants or makeup a disappearing reactant, a quench fluid system 80 (best seen in FIGS. 4A and 4B) may be provided to inject the quench fluid into the swirl chamber. The quench fluid may be from an external source or an internal source and is generally introduced through a quench feed pipe 82 that passes through the vessel wall 11. The quench feed pipe 82 may be connected to a concentric manifold 84 that passes through the openings 76 in the second set of radial support beams (where two sets are provided) and encircles the swirl chamber 20.

Quench laterals 86 (FIGS. 4A and 4B) communicate with the manifold to transfer the quench fluid to the swirl chamber. The quench laterals 86 terminate with nozzles 88 that extend inward through the swirl chamber wall under the tangential ramps. Preferably, the nozzles terminate at about the innermost portion of the impinging wall 48. (FIG. 3) The nozzles have an opening 90 to discharge the quench fluid into a corresponding incoming fluid stream flowing down the tangential ramps. The opening 90 may be oriented so that the quench fluid will be directed circumferentially into the vessel. The nozzles may have a horizontal slot or a number of spaced in-line orifices on the same side as the circumferential baffle openings 54 to produce flow parallel to the reactants flowing down the ramps. Therefore, the quench fluid mixes with the swirling reactant fluid flowing beneath the ramp to achieve cooling of the reactant fluid.

Alternately, mixing of the quench fluid with the reactant fluid on the ramp may be achieved by orienting the opening 90 to produce flow which opposes the flow of the fluid exiting the ramp (FIG. 4C). FIG. 4C schematically illustrates the positioning of the nozzle 88, having an opening 90 (not shown) in the direction opposite to that of the fluid flow from the circumferential opening 54.

Introduction of the quench fluid into the side of the swirl chamber (rather than above) reduces the overall vertical height of the apparatus. Furthermore, allowance does not have to be made for the quench piping between the catalyst support beams and the top of the liquid collection tray. In addition, introduction of the quench fluid into the swirl chamber promotes the mixing of the fluids. The swirl chamber design therefore achieves excellent liquid-liquid mixing and vapor-vapor mixing of fluids from all sections of the reactor to approach thermal equilibration. This eliminates hot zone propagation from one bed to the next.

Figure 4D:
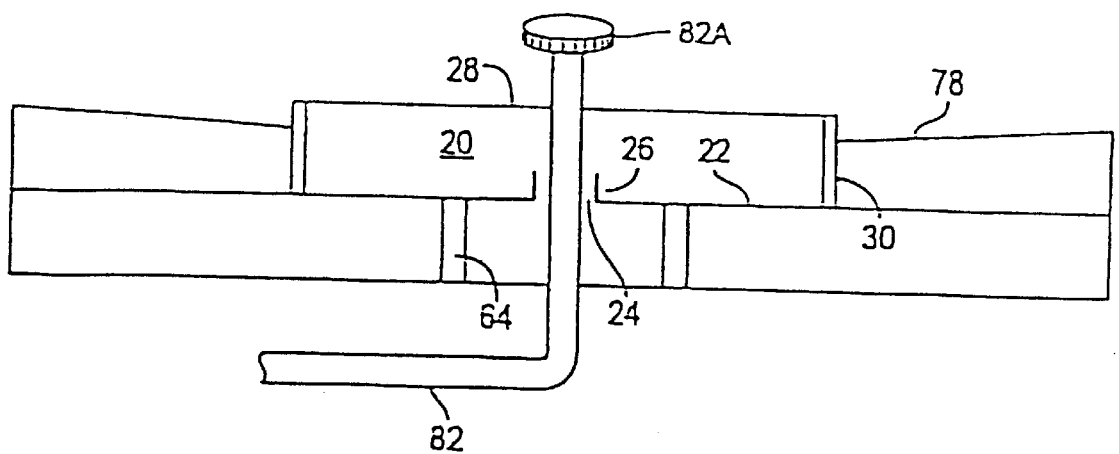
FIG. 4D is a cross-section of the swirl chamber illustrating an alternative placement of the quench fluid piping.

In one alternative embodiment, the quench feed pipe 82 may be introduced through the bottom of the swirl chamber and extend above the ceiling 28 and the liquid collection tray 78. This is illustrated schematically in FIG. 4D. As shown in FIG. 4D, the quench feed pipe 82 enters the swirl chamber 20 from beneath the swirl chamber and is routed upwardly through the orifice 24, the ceiling 28 and above the liquid collection tray 78. The quench feed pipe terminates in a nozzle (not shown) which is covered by a deflector 82A. Any suitable nozzle and deflector may be used. This embodiment enables the quench fluid to be introduced above the swirl chamber, thereby forcing the quench fluid to come into close contact with fluids from the upstream of the reactor and undergo efficient mixing with such fluids.

In another alternative embodiment (schematically illustrated in FIG. 4E), the quench fluid may be introduced through a quench feed pipe 82 routed horizontally below the swirl chamber 20, extending vertically through the central outlet orifice (or "central orifice") 24, and terminating inside the swirl chamber. This alternative embodiment retains the above-mentioned advantage of reduced vertical height as the quench feed pipe utilizes the vertical height required by the webs 68 of the radial support beams.

Figure 4E:
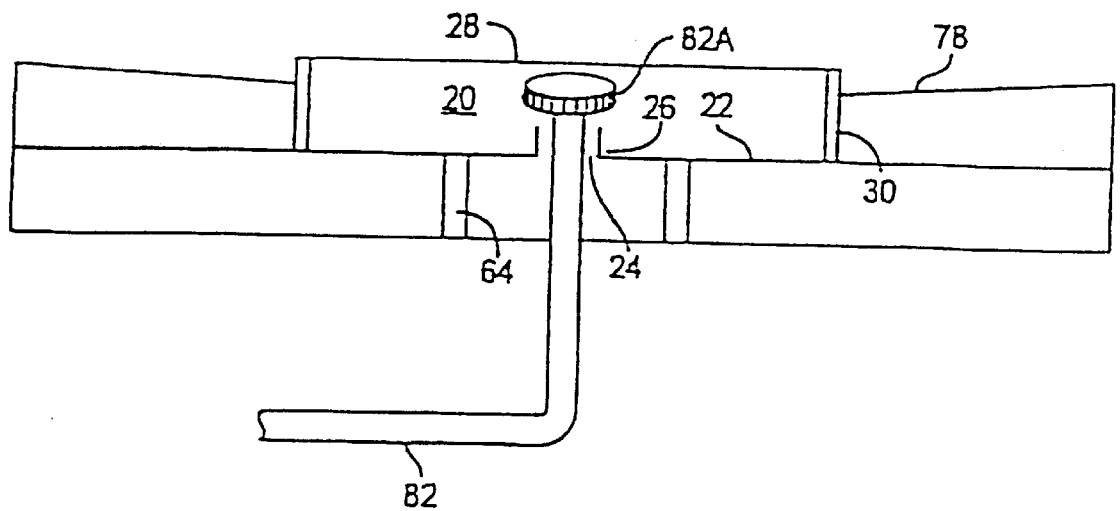
FIG. 4E is a cross-section of the swirl chamber illustrating yet another alternative placement of the quench fluid piping.

In the embodiments of FIGS. 4D and 4E, the concentric manifold 84, quench laterals 86, and nozzles 88 are not required. It will be understood that FIGS. 4D and 4E are intended to illustrate schematically the concept of an alternative manner of introduction of the quench fluid. Thus, in these figures not all of the details of the pictured portion of the device are illustrated.

As noted above, the swirl chamber has a floor 22 consisting of a solid plate that surrounds a central orifice 24. An overflow weir 26 about the periphery of the orifice extends above the orifice to define a basin on the floor inside the swirl chamber. At the center of the swirl chamber, the fluid overflows the weir and exits the swirl chamber.

The fluid exiting the swirl chamber is directed downward to the rough distribution network 100 (best seen in FIGS. 4A, 5A, 5B, and 5C) which collects the swirl chamber exit fluid and directs it radially outward and onto the distribution apparatus 120. The rough distribution network includes a splash plate 102 and channels 108 in fluid communication with the splash plate. The splash plate is located below the swirl chamber outlet weir and may be removably secured by a support 65 attached to the central hub 64 of the support structure. The splash plate has apertures 104 to allow some of the fluid to pass through and onto the redistribution plate 122. The splash plate also has shallow sides 106 except possibly where it intersects with the channels 108. At these intersections, the shallow sides preferably have openings connecting the splash plate with the channels to ease the fluid passage. Fluid accumulating on the splash plate will flow into the channels and radially outward into the vessel.

In an alternative embodiment, the shallow sides 106 of the splash plate 102 may be omitted, provided that proper sealing between the splash plate 102 and the support 65 is achieved to minimize fluid leakage.

The channels 108 are in communication with the splash plate and extend radially outward toward the vessel wall. Preferably, the channels are attached to the webs 68 of the first set of radial support beams (where two sets are provided). The channels have shallow sides 110 that provide a conduit for fluid to flow toward the reactor wall. The channels, however, may have any shape suitable for collecting the fluid and distributing it across the surface of the redistribution tray. For example, the channels may be substantially U-shaped, with either a flat horizontal bottom or a rounded bottom, or may be V-shaped. At intervals along the channels, notches 112 are provided in the sides to produce the desired distribution of fluid onto the redistribution plate. Preferably, the shape and location of the notches provides a symmetrical dispersion of the fluid across the surface of the redistribution plate.

Below the splash plate is the distribution apparatus 120. The distribution apparatus may be fastened to the first set of radial beams (where two sets are provided) by for example, supporting it on the bottom flange of the first set of radial beams and fastening, if desired, by any suitable means to the bottom flange of the radial beams. As shown in FIGS. 6A and 6B, the distribution apparatus includes a redistribution plate 122 with a plurality of apertures 124, a plurality of bubble caps 130, and a plurality of associated drip trays 150. Preferably, the redistribution plate fills substantially the entire cross section of the vessel and is oriented substantially horizontal to provide a substantially level area to collect the fluid from the rough distribution network. The apertures 124 in the plate are preferably symmetrically distributed to achieve a symmetrical distribution of fluid across the catalyst surface.

FIGS. 6A and 6B show bubble caps associated with the apertures of the redistribution plate. Preferably, an individual bubble cap is associated with, e.g., located above, an individual aperture to provide substantially the sole means for fluid to pass through the redistribution plate. In this preferred embodiment, the redistribution plate is sealed to prevent the fluids from bypassing the bubble caps. Since the plate apertures are symmetrically distributed, the bubble caps are likewise symmetrically distributed. It is to be understood, however, that many other arrangements may be suitable.

Generally, one of the design considerations for the tray is that there be a sufficient number of bubble caps to ensure substantially uniform liquid distribution over the entire surface of the plate. The optimum number of bubble caps for any given purpose will depend upon many factors, the most obvious being the size of the reactor. Other contributing factors may be the liquid and gas flow rate to the reactor and the proportion of the feed remaining in the liquid phase. In general, the design of the redistribution plate will provide the proper number of bubble caps to assure acceptable liquid distribution and establish optimum liquid level on the upper surface of the tray and concomitant optimization of gas flow through each bubble cap for a given feed rate and reactor size.

The bubble caps 130 include a riser 132 and a spaced apart cap 140 to form an inverted U-shaped flow path for the gas and liquid. The riser, which is generally cylindrical in form, has a lower lip 134 or extension that is received within an aperture in the plate 122, and a top 138. The riser may be cut from a length of tubular material or may be rolled from a length of sheet stock as desired. The riser is secured to the redistribution plate by, for example, metal rolling or welding, or some other similar and suitable means. The riser has an inner passageway 136 between the lower lip and the top that provides a means of fluid communication across the redistribution plate. In one of the preferred embodiments where an individual bubble cap is associated with an individual aperture, the inner passageway of the riser provides substantially the sole means of fluid communication across the redistribution plate.

The cap 140 encompasses the top of the riser but is spaced from the riser to define a bubble cap annulus (or annular space). The cap comprises a top wall 142 terminating about its periphery in a downwardly extending skirt 144 that terminates above the upper surface of the redistribution plate and forms a gap between the skirt and the upper surface of the redistribution plate. Preferably, the cap has a plurality of slots 146 in its lowermost outer periphery such as shown in U.S. Pat. No. 3,218,249, incorporated herein by reference. The slots allow the gas or vapor to flow into the annulus. The slots also provide a pressure drop such that the liquid level in the annular space defined by the cap and the riser is higher than the liquid level on the redistribution plate. The higher liquid level in the annular space will tend to offset any irregularities in the liquid level on the redistribution plate and ensure a substantially uniform gas-liquid flow through each bubble cap, and substantially uniform mixing of the gas and liquid.

At least one spacer 148 is located intermediate to the riser and the cap to maintain the two in a spaced apart relationship with one another. The spacer or spacers may also be arranged so that the riser and the cap are maintained in a concentric relationship to each other. The spacer may be fastened to the riser, the cap, or both so that the top wall of the cap rests on the spacer. Preferably, the spacers extend radially outward to maintain the cap substantially centered with respect to the riser.

The bubble cap design promotes uniform liquid distribution even when the tray is not perfectly level or when there are differences in liquid depth across the tray. In addition, the liquid and gas phases are more intimately contacted compared to a chimney type distributor. This increases the level of thermal equilibration of the reactants.

In operation, the liquid phase, substantially disengaged from the vapor (or gas) phase by gravity as it falls from the rough distribution network, fills up on the redistribution plate to a level below the slot depth in the bubble caps, with the level being determined primarily by the gas flow rate per cap. It is, of course, necessary that some of the slot openings be exposed above the liquid surface to permit the gas to pass through.

The pressure drop through the redistribution tray in the reactor, which is normally quite small, forces the gas under the cap, either through the slots or under the cap. The gas entrains the liquid that is present on the surface of the tray as it passes through the slots or under the cap. The fluid (gas and liquid) then flows upwardly through the annulus between the cap and the riser, reverses direction and flows through the passageway defined by the riser. The bottom of the riser extends through the aperture in the plate to provide a drip edge for liquid disengagement.

Although bubble caps may satisfactorily distribute the fluid across the catalyst surface, the present invention contemplates increasing the number of fluid drip streams exiting the redistribution plate to further enhance the symmetrical distribution of the fluid across the catalyst surface. Consequently, in one embodiment, the present invention contemplates providing at least some horizontal drip trays 150 associated with at least some bubble caps and located underneath the associated bubble caps. An individual drip tray may be associated with and located directly underneath an individual bubble cap to collect the liquid from that cap and distribute it in a more finely divided and even more symmetrical pattern than can be achieved without the drip tray.

The drip tray 150 is constructed with a bottom 152 and a plurality of side walls 154 extending upward from the bottom. The bottom has at least one discharge port 156 and, preferably has at least two discharge ports to effectively multiply the number of drip streams. As shown in FIG. 6B, the bottom of the drip tray has a plurality of discharge ports disposed relatively close to the corners to evenly discharge the liquid from the drip tray. It is to be recognized, however, that a variety of methods or devices may be suitable to accomplish the objective of multiplying the number of drip streams.

The drip tray is secured to the redistribution plate by, for example, welding. FIG. 6B shows mounting tabs 158 extending upward from the drip tray to be secured to the underside of the redistribution plate. Of course, any other suitable attachment methods can be used. The drip tray is spaced from the bottom opening of the riser and is oriented in a horizontal manner. The horizontal positioning of the drip tray (or trays) permits the liquid traveling downward to accumulate within the drip tray and then be discharged from the tray in at least one, and preferably in more than one, stream through the discharge ports. Preferably, the drip tray is spaced a distance of about 1 to 2 inches from the redistribution plate.

Figure 7:
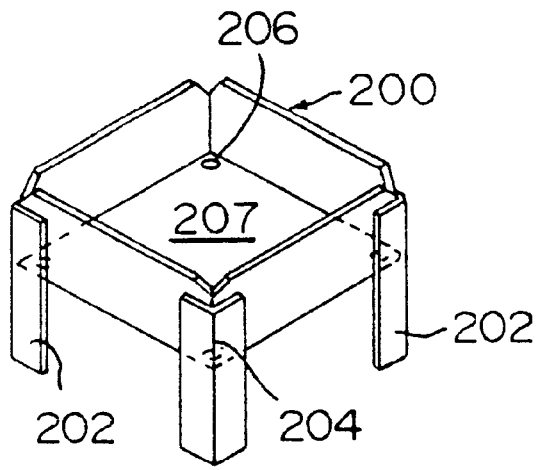
FIG. 7 is a perspective view of an alternative embodiment of the drip tray as shown in FIG. 6B illustrating a plurality of drip guides.

Referring now to FIG. 7, there is shown an alternative embodiment of a drip tray 200 having drip guides. The drip tray 200 is shown with the drip guides 202 placed at each corner 204 to protect and guide the discharged liquid falling from the discharge ports 206 formed in the bottom 207 of the drip tray.

Figure 8:
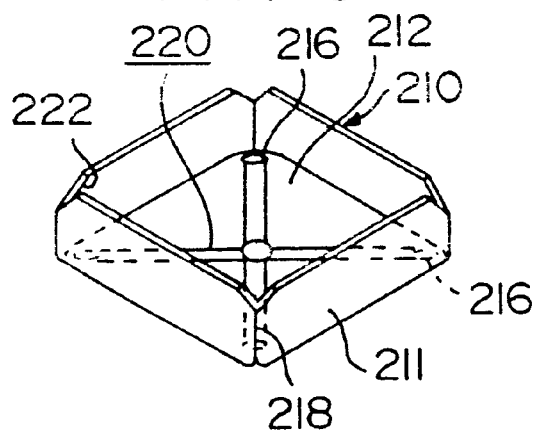
FIG. 8 is a perspective view of an alternative embodiment of the drip tray shown in FIG. 6B illustrating an alternative bottom construction.

Another embodiment of the drip tray is shown in FIG. 8. In this embodiment, a drip tray 210 is constructed with side walls 211 surrounding a bottom surface 212. A plurality of discharge ports 216 are positioned relatively close to the corners 218 of the drip tray. The bottom of the drip tray also has a number of indentations 220 to form a pattern of flow channels leading outwardly to the discharge ports and to further enhance the equal distribution of the liquid through the discharge ports. V-shaped notches 222 may be provided at the corners of the top of the side walls to accommodate overflow from the drip tray in the event of high liquid flow rates.

Figure 9:
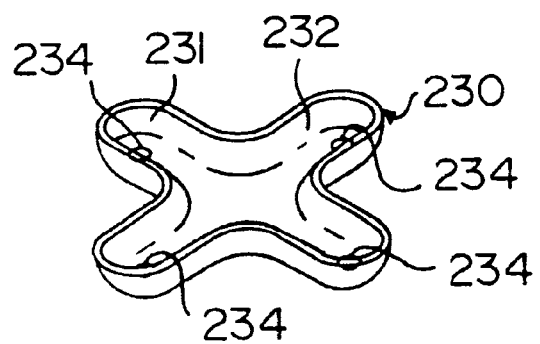
FIG. 9 is a perspective view of an alternative embodiment of the drip tray that may be useful in the apparatus of the present invention.

In yet another alternative embodiment of the drip tray, FIG. 9 shows a drip tray 230 having an x-shape. In this embodiment, the drip tray 230 is constructed with four arms 231 each having side wall portions 232 to define a controlled flow area. A discharge port 234 is provided at the end of each corner of the drip tray for the discharge of the collected liquid.

While various alternative shapes of drip trays have been illustrated, one skilled in the art will appreciate that any shape suitable for collecting and distributing liquid through a multiplicity of discharge points (or ports) may be used. One skilled in the art will also understand that modifications may be made to the drip tray to achieve symmetry and flow balance as necessary to meet the desired performance parameters for a particular reaction vessel. The drip trays will therefore more finely divide the liquid stream entering the catalyst bed below.

It will be appreciated that the bubble cap design described above provides substantially uniform liquid distribution even when the redistribution plate is not perfectly level or when there are differences in the depth of the liquid across the surface of the plate. In addition, the liquid and gas phases will be more intimately contacted, especially as compared to prior art chimney type distributors. Consequently, the level of thermal equilibration of the reactants, i.e., the gas and liquid, is increased.

Figure 10:
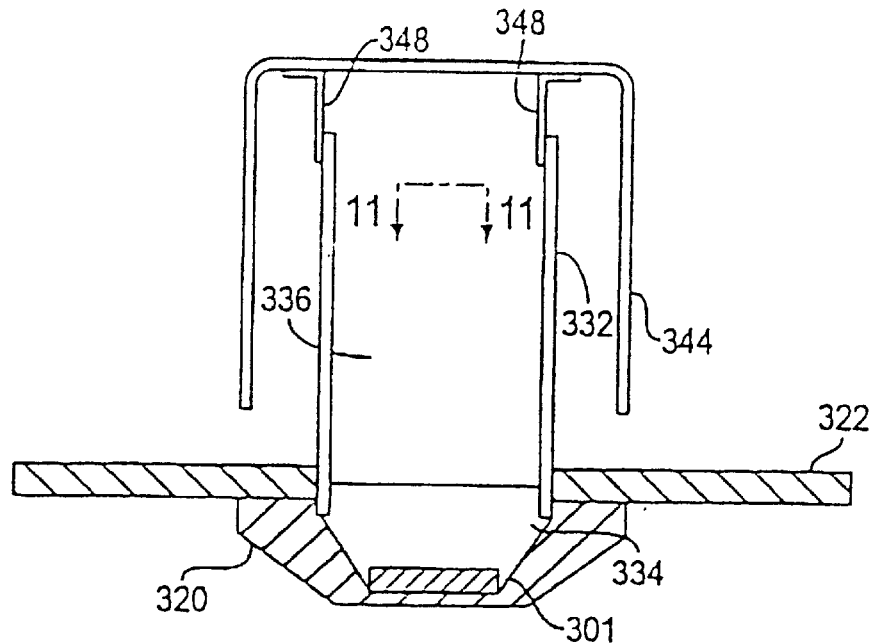
FIG. 10 is a cross-sectional view of an alternative embodiment of a bubble cap.
Figure 11:
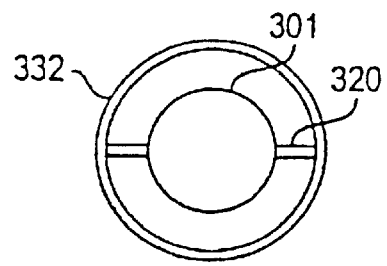
FIG. 11 is a top elevation view of the bubble cap taken along the view line 11—11 of FIG. 10.
Figure 12:
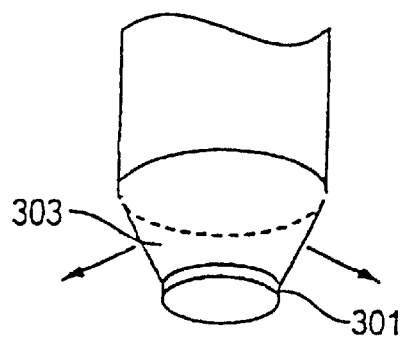
FIG. 12 is a schematical perspective view of a portion of the bubble cap of FIG. 10.
Figure 13:
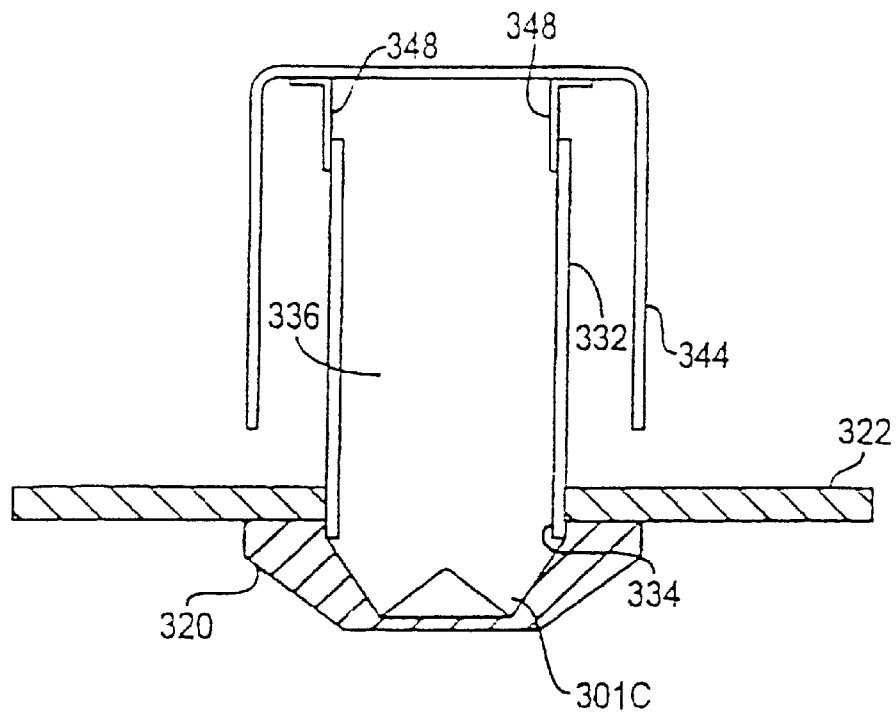
FIG. 13 is a cross-sectional view of a bubble cap with an alternative deflector baffle.
Figure 14:
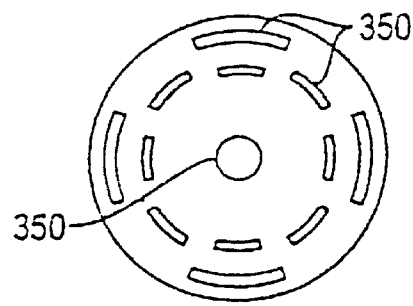
FIG. 14 is a top view of an alternative embodiment of a deflector baffle.
Figure 15:
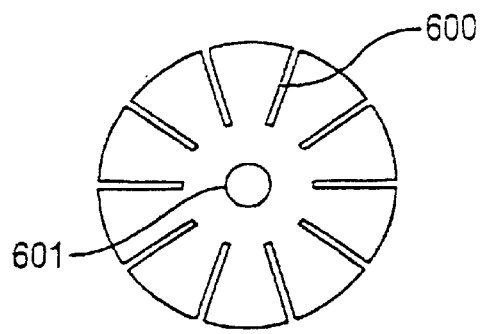
FIG. 15 is a top view of yet another alternative embodiment of a deflector baffle.

In an alternative embodiment, instead of a drip tray, a deflector baffle may be attached just below the outlet of the riser inner passageway 336. (FIGS. 10, 11 and 12). The bubble cap illustrated in FIGS. 10 and 11 (and FIGS. 13, 16–19, discussed below) has a somewhat different design from the bubble cap of FIG. 6B. Nonetheless, the modifications of the bubble caps discussed in connection with the design of FIGS. 10, 11, 13 and 16–19, are equally applicable to the bubble cap design of FIG. 6B. The bubble cap illustrated in FIGS. 10, 11, 13 and 16–19 is of a construction known in the art. Ballard et al., U.S. Pat. No. 3,218,249, Treese, U.S. Pat. No. 5,045,247 and Shih et al., U.S. Pat. No. 5,158,714, incorporated herein by reference, disclose bubble caps of such design. In FIGS. 10, 11, 13 and 16–19, whenever appropriate, various elements are labeled with reference numerals having the same last two digits as the corresponding elements in the preceding Figures. For example, the plate 322 of FIG. 10 corresponds to the plate 122 of FIG. 6A. The basic design of the bubble cap of FIGS. 10, 11 (and, thus, 13, 16–19) is conventional in the art (other than the modifications of this invention) and is only summarized herein. The bubble cap of these figures includes a skirt 344, a spacer 348, and a riser 332 (FIG. 10). An annular space is formed between the skirt and the riser. The lower lip 334 of the riser and the outer edge of the deflector baffle 301 define a riser outlet distribution orifice 303 (FIG. 12). The arrows in FIG. 12 show the direction of flow of fluid from the riser outlet distribution orifice. The deflector baffle may take various shapes, including as examples: a substantially flat, solid, round disc (FIGS. 10 and 11), a frusto-conically shaped disk or a cone with its apex pointing upward toward the outlet of the riser inner passageway 336. The cone may have apertures in its side surface. Examples of suitable deflector baffles are illustrated in FIGS. 10 and 13–15. An inverted, conically-shaped deflector baffle 301C is illustrated in FIG. 13. FIG. 14 shows the top view of a substantially flat, solid deflector baffle with openings 350. FIG. 15 is a top view of a deflector baffle having the shape of a substantially flat disc with slots 600, and an opening 601.

The cross-section of the deflector baffle may have any suitable shape, e.g., circular (or round) or pyramidal. If the deflector baffle is pyramidal, it would be preferably placed under the outlet of the riser inner passageway, so that the apex of the pyramid faces into the passageway (similarly as shown in FIG. 13 for the cone-shaped deflector baffle). In one preferred embodiment, the cross-section of the deflector baffle is circular (FIGS. 10–11). The deflector baffles may be attached just below the outlet of the riser inner passageway in any suitable manner. One way of attaching a deflector baffle is illustrated in FIGS. 10 and 13. In FIGS. 10 and 13, the defector baffle is attached to a lower lip 334 by an attachment means, such as a crossbar 320.

The distance between the outlet of the riser inner passageway and a deflector baffle may vary, depending on a variety of factors, such as process design, and may be determined by those skilled in the art.

In contrast to the drip tray 210, however, the primary intent (or function) of the deflector baffle is to redirect the majority of the downflowing fluid from its principally vertically downward path, as a relatively narrow stream through the middle of the riser outlet distribution orifice (as is often the case with risers without a deflector baffle). With a deflector baffle, the fluid is distributed in a pattern over a wider area of the catalyst bed below. Preferably, the spray patterns emanating from adjacent deflector baffles would overlap, providing a substantially uniform fluid coverage over the catalyst bed. This can be accomplished by various means, e.g., by adjusting velocity of the fluid flow through the distribution orifice 303.

The present invention also contemplates yet another alternative means of increasing the number of fluid drip streams exiting the redistribution plate to further enhance the symmetrical distribution of the fluid across the catalyst surface. Consequently, in a preferred embodiment, the present invention contemplates providing a plurality of riser vanes associated with (or included in) at least some bubble caps and located between the top 438 of the riser 432 and the underside of bubble cap top wall 442 (FIGS. 16, 17). Preferably, an individual set of riser vanes 460 is associated with and directly attached concentrically to the top of an individual riser 432. Preferably, the top edge of the riser vanes should be flush against the underside of the bubble cap top wall 442, to prevent the passage of fluid between the bubble cap top wall 442 and the riser vanes. The riser vanes are spaced apart from one another (FIG. 17), defining therebetween vane passageways 461 for fluid communication between the bubble cap annulus and the riser inner passageway 436, with said vane passageways being preferably the sole means of fluid communication between the bubble cap annulus and the riser inner passageway. At least one spacer 448 is located between the riser and the cap to maintain these two elements spaced from each other. The spacer or spacers may also be arranged so that the riser and the cap are maintained concentrically to each other. The spacer may be fastened to the riser, the cap, or both so that the top wall of the cap rests on the spacer. Preferably, the spacer(s) extend radially outward to keep the cap substantially centered relative to the riser.

In operation, liquid (and vapor) entering the vane passageways from the bubble cap annulus will be directed circumferentially about the inner wall of the riser 432. In contrast, without the vanes, the liquid (and vapor) would be likely to randomly flow down, usually through the center of the riser inner passageway 436. The circumferential flow path of the liquid (and vapor) results in a more uniform wetting of the inner wall of the riser 432, and hence a more uniform distribution of the liquid as it falls from a lower lip 434 of the riser (similar to the lip 134 in FIG. 6B). It is further believed that the riser vanes, when used in conjunction with the deflector baffles discussed previously, will produce a significant improvement in the uniformity of the distribution of the fluids to the catalyst bed below.

The riser vanes may be flat, curved in shape or cut at an angle and may be formed from the same tubular material or rolled sheet stock as the riser 432. FIGS. 18 and 19 illustrate an embodiment with the riser vanes 560 cut at an angle. Also, in this embodiment, notches 562 formed in the lower lip 534 of the riser can aid in a more uniform distribution of the liquid exiting the riser inner passageway. In a preferred embodiment, the riser vanes are integral to the riser, being formed by machining and bending the uppermost portion of the tubular material from which the riser is formed.

While the present invention has been described with reference to providing a unique quench zone mixing device that includes a swirl chamber, a rough distribution network, and a distribution apparatus, the present invention also contemplates an improvement in known quench zone mixing devices. In particular, a rough distribution network is interposed between a mixing chamber and a distribution apparatus. The rough distribution network includes a splash plate in fluid communication with outwardly extending channels. Preferably, the channels extend outward radially from the splash plate.

The splash plate is located below the exit opening or openings of the mixing chamber and collects the fluid (e.g., a liquid) from the mixing chamber. The splash plate may have shallow sides except possibly where it intersects with the channels. Fluid accumulating on the splash plate will flow into the channels and radially outward. The splash plate preferably has a few apertures and the channels preferably include side walls with spaced apart notches to allow fluid to exit the channels. Preferably, the shape and location of the notches provides a symmetrical dispersion of the fluid across the surface of the distribution apparatus.

In addition, the present invention relates to the above-described distribution apparatus which is not associated with the quench zone mixing apparatus. For example, as shown in FIG. 1, the distribution apparatus 120 may be provided near the top of the reactor. In this embodiment, the distribution apparatus will collect fluid from above, evenly distribute it across the top surface of the redistribution plate, and further distribute the fluid downward to a down stream section of the reactor. While the distribution apparatus has been shown as being located near the top of the reactor, one skilled in the art will appreciate that the apparatus may be suitably located where needed in the reactor.

The present invention also contemplates using the above-described embodiments of the quench zone mixing device in a process for contacting a fluid with a gas or liquid. Preferably, the process occurs in a portion of a reactor between two successive spaced apart beds of particle form solids, e.g., catalyst particles. The process includes passing the fluid with a gas through the quench zone mixing device of this invention, which is placed between the two successive beds.

In another embodiment, the process includes introducing a fluid into a plurality of inlet openings provided on a swirl chamber. The swirl chamber includes a wall disposed between a ceiling and a floor which includes an orifice that provides a means of fluid communication out of the swirl chamber. The wall defines an inside of the swirl chamber. The fluid is mixed with a quench fluid that is also introduced into the swirl chamber to produce a swirl chamber fluid mixture. The swirl chamber fluid mixture is transported out of the swirl chamber and is collected on a rough distribution network disposed beneath the swirl chamber. The rough distribution network includes a splash plate and outwardly extending channels, wherein the splash plate is adapted to collect the swirl chamber fluid mixture and radially distribute it through the channels and onto a distribution apparatus disposed beneath the rough distribution network. The distribution apparatus includes a redistribution plate having a plurality of apertures and a plurality of bubble caps with at least some of the bubble caps associated with at least some of the apertures and collects the swirl chamber fluid mixture. The collected swirl chamber fluid mixture is transported through the redistribution plate via the apertures and the bubble caps.

In one embodiment, a plurality of substantially horizontal drip trays are provided with at least some of the drip trays located underneath the redistribution plate and associated with at least some of the bubble caps, wherein the drip trays receive the fluid exiting the bubble caps and distribute it through at least one discharge port in the drip trays. If gas is present in the fluid, at least some separation of the gas from the fluid takes place in the bubble caps and on the drip trays.

As noted throughout, the embodiments described above provide a number of significant advantages. Importantly, the overall pressure drop across the device is expected to be low while achieving excellent mixing and distribution of the gas and liquid.

By providing a fluid (e.g., liquid) collection tray that is sloped, the residence time of the liquid on the tray is minimized which reduces thermal cracking of the liquid and in certain processes reduces coking and the formation of precursors of polynuclear aromatics.

The presence of spaced apart inlet openings on the side wall of the swirl chamber reduces the overall vertical height of the quench zone mixing apparatus. In addition, by providing side inlet openings, the quench fluid can also be introduced into the side of the swirl chamber which also aids in minimizing the overall vertical height of the apparatus. As a result, the height of the reactor vessel can be reduced, thereby reducing the capital cost of the reactor vessel.

Where baffles are provided, the fluid is directed downwardly and circumferentially and can be intimately contacted by the quench fluid that is introduced into the side of the swirl chamber to provide an efficient mixing and equilibration of the two fluids. Moreover, by creating a swirling flow of both, the fluids from the multiple inlet openings and the quench fluid, an intimate mixing of fluids from all sections of the vessel can be achieved that will minimize hot zone propagation from one catalyst bed to the next.

In the preferred embodiment where the baffles are attached to the inside of the swirl chamber, there will be no need to remove the baffles during maintenance. Consequently, the swirl chamber can be easily maintained.

As pointed out above, in a preferred embodiment the rough distribution network includes channels that are attached to the radial beams. The channels will not obstruct access to the redistribution tray from above and will, therefore, facilitate maintenance when cleaning of the redistribution tray is required. In addition, the number of individual pieces required is reduced which, in turn, reduces the capital cost, assembly time and maintenance cost.

By including the support structure as described above, the reactor design and fabrication will be simplified since multiple support rings or internal skirts will be dispensed with. Moreover, by dispensing with an internal skirt, the entire interior surface of the reactor will be available for inspection.

In one embodiment, drip trays are used with each bubble cap on the redistribution tray. The bubble caps provide good distribution of gas and liquid over the cross sectional surface below the redistribution tray. The drip trays improve the liquid distribution by multiplying the liquid distribution points. The drip trays can also extend under fixed internals such as beams or wall support rings to wet areas that could not be reached by the normal bubble cap or by a chimney type distribution device.

In another preferred embodiment, a deflector baffle is utilized to substantially prevent the flow of fluid in a relatively narrow stream substantially through the middle of the cross-section of the riser. The deflector baffle provides a substantially uniform distribution of the fluid in a pattern over a wider area of the catalyst bed below.

In yet another preferred embodiment a plurality of riser vanes included in at least one of the bubble caps, between the top of the riser and the underside of a bubble cap top wall, define vane passageways. The vane passageways cause the fluids (liquid and vapor) to be directed circumferentially about the inner wall of the riser, thereby promoting a more uniform distribution of the liquid as it exits the riser.

It should be understood that a wide range of changes and modifications can be made to the embodiments described above. It is therefore intended that the foregoing description illustrates rather than limits this invention, and that it is the following claims, including all equivalents, which define this invention.

What is claimed is:

1. A mixing apparatus comprising:
   a swirl chamber having an outlet; and
   a distribution network in fluid communication with, and downstream of the outlet, having a plurality of fluid guides extending outwardly relative to the outlet, and a plurality of bubble caps having a plurality of riser vanes.

2. The mixing apparatus of claim 1 in which the swirl chamber is disposed to receive a material from a plurality of openings, each of which is fitted with a member that at least partially directs the material in a swirling motion.

3. The mixing apparatus of claim 1 in which the swirl chamber is disposed to receive a material from a plurality of openings, each of which is fitted with a ramp sloping downward in a direction of flow into the swirl chamber.

4. The mixing apparatus of claim 1 in which the swirl chamber is fitted with a plurality of wall baffles.

5. The mixing apparatus of claim 1 further comprising a collection tray having a plurality of floor baffles upstream of the plurality of openings.

6. The mixing apparatus of claim 1 further comprising a pipe that feeds a quench material into the swirl chamber.

7. The mixing apparatus of claim 1 wherein each of the plurality of bubble caps further includes a riser and a cap, positioned such that the riser vanes are located between the riser and the cap.

8. The mixing apparatus of claim 1 wherein the plurality of riser vanes are spaced apart from each other to define a plurality of vane passageways.

9. The mixing apparatus of claim 1 wherein the riser vanes are flat, curved, or cut at an angle.

10. The mixing apparatus of claim 1 wherein the outlet and the fluid guides are disposed in a hub and spoke configuration.

11. The mixing apparatus of claim 1 in which the swirl chamber has a wall that includes a plurality of openings that receive a material and impart a swirling force to the material, and a ramp sloping downward in a direction of flow into the swirl chamber.

12. The mixing apparatus of claim 11 in which the wall is fitted with a plurality of wall baffles, and further comprising a collection tray having a plurality of floor baffles fluidly communicating with, and upstream of the plurality of openings.

13. The mixing apparatus of claim 1 wherein the fluid guides are also radial support beams that support the swirl chamber.

14. The mixing apparatus of claim 1 further comprising a splash plate fluidly interposed between the outlet of the swirl chamber and the distribution network.

15. A bubble cap comprising a riser, a cap, and a plurality of riser vanes.

16. The bubble cap of claim 15 wherein the riser is upstream of the plurality of riser vanes and cap downstream of the riser vanes, relative to a fluid flowing through the bubble cap.

17. The bubble cap of claim 15 wherein the plurality of riser vanes are spaced from each other to define a plurality of vane passageways.

18. The bubble cap of claim 15 wherein the riser vanes are flat, curved, or cut at an angle.

19. A mixing apparatus comprising a distribution zone that includes the bubble cap according to claim 15.

20. A mixing apparatus comprising a distribution zone that includes the bubble cap according to claim 17.

* * * * *

UNITED STATES PATENT AND TRADEMARK OFFICE
CERTIFICATE OF CORRECTION

| | | |
|---|---|---|
| PATENT NO. | : 6,098,965 | |
| DATED | : August 8, 2000 | |
| INVENTOR(S) | : Garry E. Jacobs, Steven W. Stupin, Robert W. Kuskie and Robert A. Logman | |

It is certified that error appears in the above-identified patent and that said Letters Patent is hereby corrected as shown below:

<u>Title page,</u>
Item [73], Assignee, replace "Fluor Corporation, Aliso Viego, Calif." with
-- Fluor Corporation, Aliso Viejo, Calif. --

Signed and Sealed this

Twenty-fourth Day of December, 2002

JAMES E. ROGAN
*Director of the United States Patent and Trademark Office*